(12) United States Patent
Blakesley et al.

(10) Patent No.: US 7,350,426 B2
(45) Date of Patent: *Apr. 1, 2008

(54) SEAT BELT TENSION SENSOR HAVING SHOCK ISOLATION

(75) Inventors: Patrick B. Blakesley, Goshen, IN (US); Robert R. Rainey, Elkhart, IN (US); Murray Kaijala, Elkhart, IN (US)

(73) Assignee: CTS Corporation, Elkhart, IN (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/803,886

(22) Filed: May 16, 2007

(65) Prior Publication Data

US 2007/0214898 A1 Sep. 20, 2007

Related U.S. Application Data

(63) Continuation of application No. 11/288,856, filed on Nov. 29, 2005, now Pat. No. 7,222,545, which is a continuation of application No. 10/388,816, filed on Mar. 14, 2003, now Pat. No. 7,086,297, which is a continuation-in-part of application No. 09/923,151, filed on Aug. 6, 2001, now Pat. No. 6,578,432.

(51) Int. Cl.
*G01L 1/26* (2006.01)
*G01L 5/04* (2006.01)

(52) U.S. Cl. .................................. 73/862.391

(58) Field of Classification Search ............ 73/862.391
See application file for complete search history.

(56) References Cited

U.S. PATENT DOCUMENTS 7,086,297 B2 * 8/2006 Blakesley et al. ...... 73/862.474

* cited by examiner

Primary Examiner—Michael Cygan
Assistant Examiner—Octavia Davis
(74) Attorney, Agent, or Firm—Mark P. Bourgeois

(57) ABSTRACT

A seat belt tension sensor is attached to a seat belt assembly in a vehicle. The seat belt tensor sensor is secured to the vehicle by a bolt. The sensor includes a housing that is secured by the bolt. An anchor plate is mounted to the housing. The anchor plate has a hole for the bolt and an opening. A strain gage is secured to the housing and extends into the opening. The strain gage has an aperture. A spring is located between the anchor plate and the strain gage. An actuator support is located between the spring and the strain gage to actuate the strain gage. The actuator has a projection extending through the aperture that contacts the anchor plate. The projection prevents a shift in the output of the strain gage when the sensor is subjected to mechanical shock.

13 Claims, 21 Drawing Sheets

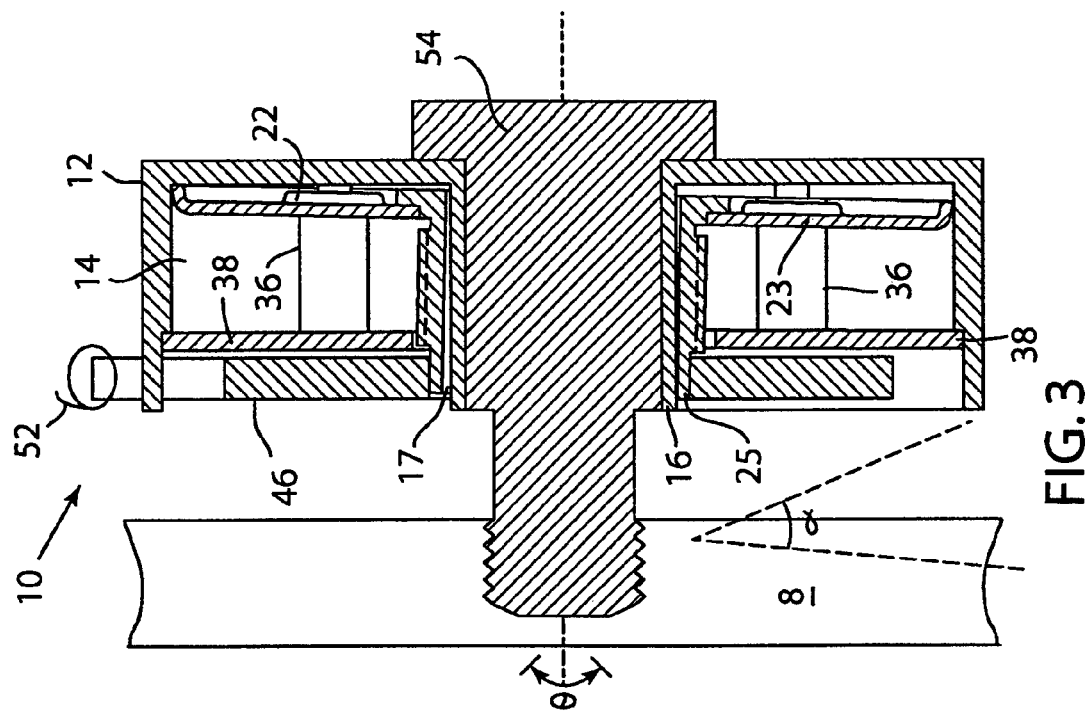
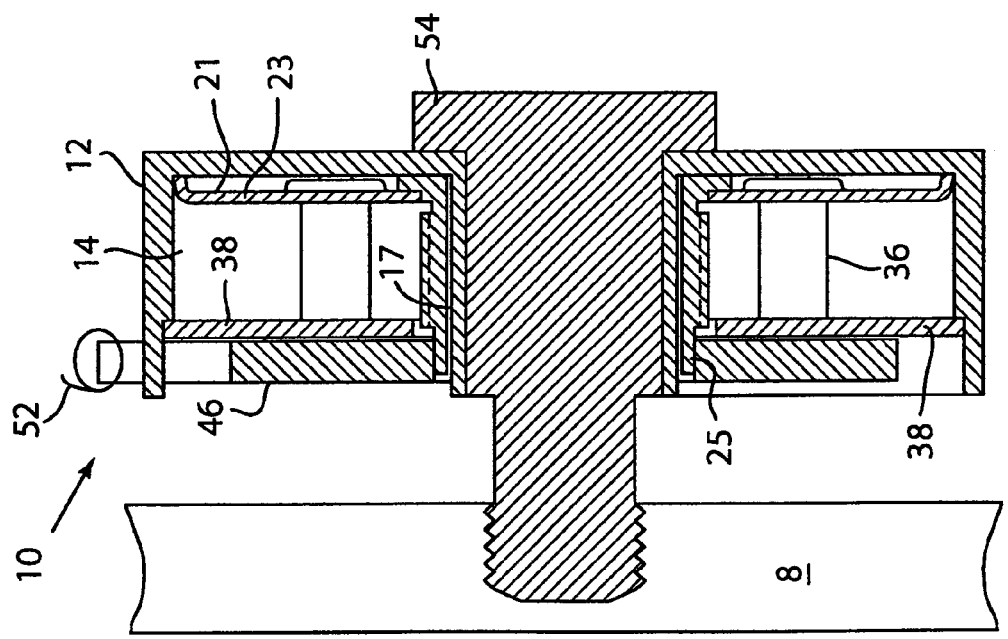
FIG. 3
FIG. 2

SEAT BELT TENSION SENSOR HAVING SHOCK ISOLATION

CROSS REFERENCE TO RELATED AND CO-PENDING APPLICATIONS

This application is a continuation of U.S. patent application Ser. No. 11/288,856 filed Nov. 29, 2005 now U.S. Pat. No. 7,222,545 and titled, "Seat Belt Tension Sensor Having Shock Isolation", which is a continuation of U.S. patent application Ser. No. 10/388,816 filed Mar. 14, 2003 now U.S. Pat. No. 7,086,297 and titled, "Seat Belt Tension Sensor Having Shock Isolation", which is a continuation in part of U.S. patent application Ser. No. 09/923,151 filed Aug. 06, 2001 and titled, "Seat Belt Tension Sensor", now U.S. Pat. No. 6,578,432.

This application is related to the following U.S. patent applications:

U.S. patent application Ser. No. 09/884,615, filed Jun. 19, 2001 and titled, "Seat Belt Tension Sensor With Overload Protection".

U.S. patent application Ser. No. 10/202,727, filed Jul. 25, 2002 and titled, "Hall Effect Seat Belt Tension Sensor".

U.S. patent application Ser. No. 10/185,242, filed Jun. 28, 2002 and titled, "Seat Belt Tension Sensor".

U.S. patent application Ser. No. 09/441,350, filed Nov. 15, 1999 and titled, "Automobile Seat Having Seat Supporting Brackets with a Stepped Weight Sensor".

U.S. patent application Ser. No. 09/374,874, filed Aug. 16, 1999 and titled, "Automobile Seat Weight Sensor".

U.S. patent application Ser. No. 09/374,870, filed Aug. 16, 1999 and titled, "Vehicle Occupant Position Detector and Airbag Control System".

U.S. patent application Ser. No. 09/422,382, filed Oct. 21, 1999 and titled, "Vehicle Seat Weight Sensor".

U.S. Pat. No. 6,209,915, issued Apr. 03, 2001 and titled, "Seat Belt Tension Sensor".

U.S. Pat. No. 6,450,534, issued Sep. 17, 2002 and titled, "Seat Belt Tension Sensor".

The foregoing patents have the same assignee as the instant application and are herein incorporated by reference in their entirety for related and supportive teachings.

BACKGROUND OF THE INVENTION

1. Field of the Invention

This invention relates to an automobile sensor for detecting the magnitude of a tensile force in a seat belt used in a car seat, and in particular to a sensor that can detect the magnitude of tension in a seat belt and provide an electrical signal that is representative of the magnitude of tensile force.

2. Description of the Related Art

Air bags have been heralded for their ability to reduce injuries and save lives. However, since their incorporation into automobiles, a problem has existed with people of smaller size and small children. Air bags are designed to cushion the impact of occupants and thus reduce the injuries suffered. However, the force needed to properly cushion the occupant varies based on the size and position of the person.

For example, a larger person requires the bag to inflate faster and thus with more force. A smaller person may be injured by a bag inflating at this higher inflation force. A smaller person is more likely to be sitting close to the dashboard and would therefore stand a higher chance of being injured by the impact of the inflating bag, as opposed to the passenger hitting the fully inflated bag to absorb the impact of the accident. An average-sized person can also be injured by an airbag inflation if they are leaning forward, as for example, if they are adjusting the radio.

Because of the concern over injury to passengers in these situations, the National Highway Transportation Safety Administration (or NHTSA), an administrative agency of the United States, is instituting rules requiring the air bag deployment system to identify the passenger size and position and inflate the air bag accordingly.

One way to accomplish this task is to use a seat belt tension sensor in conjunction with an occupant weight sensor. The weight sensor can provide an indication of the force placed by an occupant on the seat. However, if the seat belt is unduly tightened, it can place an additional downward force on the passenger, creating an erroneous weight reading. Similarly, it is common for infant car seats to be secured tightly to the seat. In this circumstance, it is critical for the system to recognize that the passenger does not warrant inflation of the air bag. By sensing the tension on the seat belt in addition to the weight reading from the seat, the actual weight of the occupant can be determined. This allows for the system to safely deploy the air bag.

SUMMARY OF THE INVENTION

It is a feature of the present invention to provide a seat belt tension sensor for use with a seat belt assembly. The seat belt tensor sensor is secured to a vehicle by a bolt. The sensor includes a housing that is secured by the bolt. An anchor plate is mounted to the housing. The anchor plate has a hole for the bolt and an opening. A strain gage is secured to the housing and extends into the opening. The strain gage has an aperture. A spring is located between the anchor plate and the strain gage. An actuator support is located between the spring and the strain gage to actuate the strain gage. The actuator has a projection extending through the aperture.

It is a feature of the present invention to provide a seat belt tension sensor for use with a seat belt assembly. The seat belt tension sensor is secured to a vehicle by a bolt. The sensor includes a housing that is secured by the bolt. The housing has a flange. An anchor plate is mounted to the housing. The anchor plate has a hole for the bolt and an opening. The flange extends into the hole. A strain gage is mounted to the housing to sense tension in the seat belt assembly and generate an electrical signal proportional to the amount of tension. A spring is mounted between the strain gage and the anchor plate. The spring transfers a first magnitude of tension from the seat belt assembly to the strain gage. The anchor plate and the flange cooperate to prevent tension greater than the first magnitude from being applied to the strain gage. Tension greater than the first magnitude is diverted through the flange to the bolt. A projection extends into the opening. A rib extends into the opening. The strain gage has a first side adjacent to the rib and a second side adjacent the spring. The spring has a first and second end. The first end is mounted over the projection. The second end is adjacent the second side of the strain gage.

BRIEF DESCRIPTION OF THE DRAWINGS

FIG. 2 is a cross-sectional view of FIG. 1 in an assembled state.

FIG. 3 is another cross-sectional view of FIG. 1 in an assembled state.

It is noted that the drawings of the invention are not to scale.

DETAILED DESCRIPTION OF THE PREFERRED EMBODIMENTS

Figure 1:
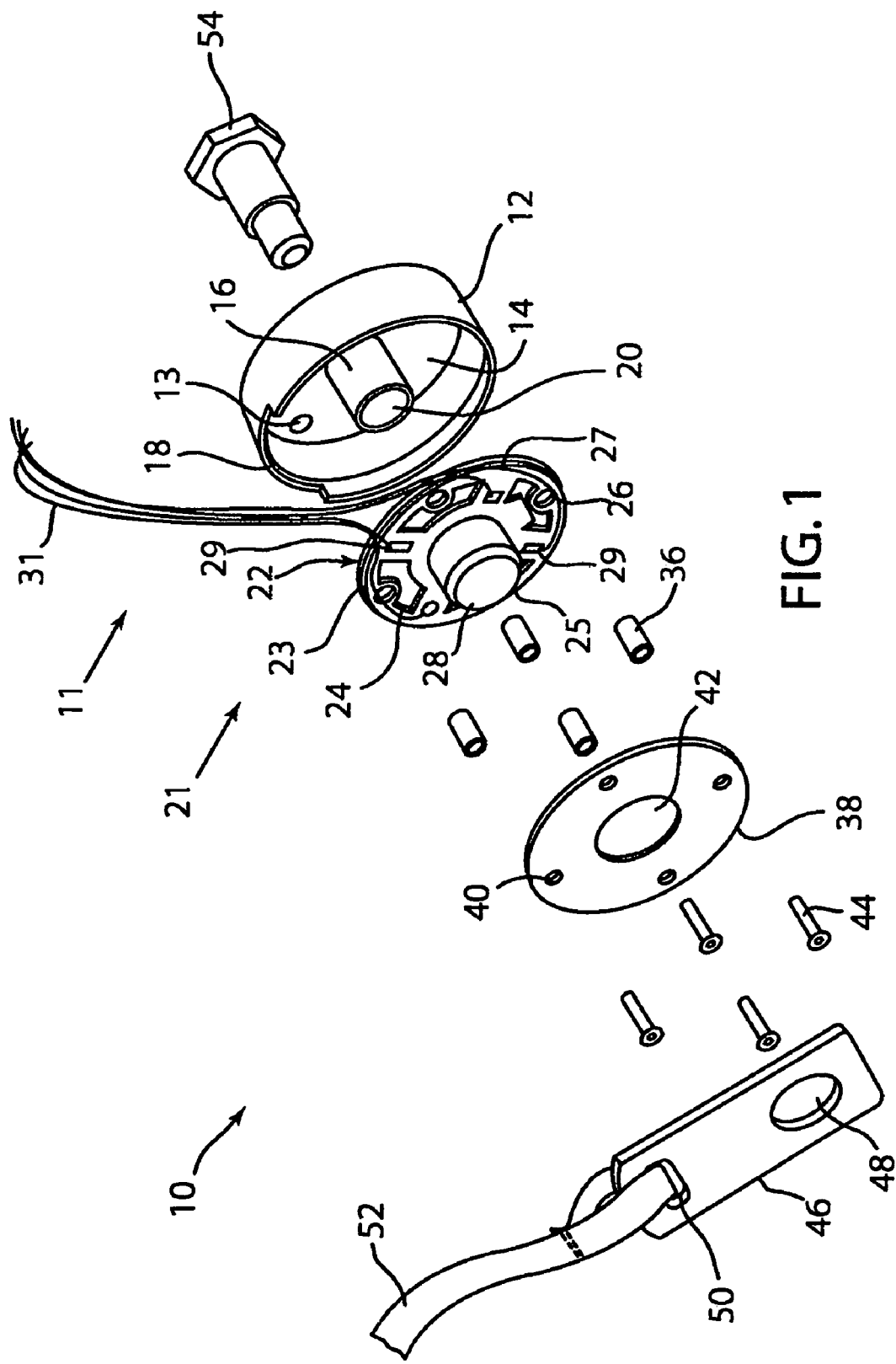
FIG. 1 is a perspective exploded view of the preferred embodiment of a seat belt tension sensor.

The present invention is a seat belt tension sensor. Referring to FIGS. 1, 2 and 3 there is a seat belt tension sensor assembly 10 shown. Assembly 10 has a limit structure 11 and a sensor 21. Limit structure 11 is fastened between seat belt components. For example, structure 11 can be attached to an anchor plate 46 that is attached to a seat belt webbing 52 and to a vehicle seat or floor 8 (FIG. 2) by fastener or bolt 54.

Limit structure 11 has a housing 12 with a cavity 14. A cylindrical flange 16 extends into cavity 14 and includes a hollow center portion 20. A recess 18 is provided on one side of housing 12 to allow anchor plate 46 to extend beyond housing 12. A circular hub 22 has a flat disc shaped portion 23, and a cylindrical rim 25 attached to and extending from the disc shaped portion 23. The rim 25 has an aperture 28 passing therethrough. Several slots 24 are located on disc 23. Several screw holes 26 are also located in disc 23. Disc 23 has several arms 27 that each have a strain gage resistor 29 mounted thereon. Hub 22 goes over flange 16 and creates a gap 17 between the rim and flange as shown in FIG. 2.

A cover 38 goes over housing 12 and is retained to housing 12 by screws 44 or other fasteners that pass through screw holes 26 and into threaded bores 13 in housing 12. Cover 38 has screw holes 40 and a central opening 42. Several springs 36 are located between cover 38 and disc portion 23. Anchor plate 46 has a mounting hole 48 that goes over rim 25. Plate 46 has a slot 50 that the seat belt webbing 52 passes through. Webbing 52 would typically be looped through slot 50 and then sewed onto itself to securely fasten the webbing to the plate.

After assembly, threaded fastener or bolt 54 extends through hollow center portion 20, rim aperture 28, central opening 42 and mounting hole 48 and mates with threads in a vehicle floor or seat 8. Fastener 54 is a conventional fastener such as a hex headed bolt, Allen head screw, shoulder screw or rivet.

Sensor 21 includes the hub 22, disc portion 23 and rim 25. Hub 22 is preferably formed from 430 stainless steel. Several strain gage resistors 29 are arranged on arms 27 around rim 25. Details of the construction and operation of resistors 29 are shown in U.S. patent application Ser. No. 09/441,350, filed Nov. 15, 1999 and titled, "Automobile Seat Having Seat Supporting Brackets with a Stepped Weight Sensor".

Resistors 29 would typically be connected in a conventional wheatstone bridge configuration. Resistors 29 are strain sensitive and will change resistance based on the amount of strain in arms 27. A wiring harness 31 would typically connect resistors 29 to an external electrical circuit.

Referring to FIG. 2, showing a normal load state for the present invention, when an occupant sits in a vehicle seat and buckles a seat belt, the tension placed in the seat belt is transferred from webbing 52 to buckle plate 46 to sensor 21 through rim 25 and disc 23. The force is transferred from disc 23 through springs 36 to cover 38 and housing 12 then to floor 8 through fastener 54. In this state, two of springs 36 are being compressed pressing down on disc 23 while two of springs 36 are in tension. An electrical output signal is generated by the resistors 29 that is proportional to the magnitude of the tension in the seat belt and is transmitted over a wire harness 31 to a conventional air bag controller (not shown). The air bag controller can then use the seat belt tension information to compute a more accurate profile of the seat occupant and use that information to control deployment of the airbag. This is the normal operational state of the seat belt tension sensor in which all of the seat belt tension is carried through the sensor 21.

In a situation where the vehicle is involved in a crash, the seat belt tension sensor operates in a different mode called a high load or crash state as shown in FIG. 3. In the high load state, the limit structure carries the tension placed on the seat belt. The amount of tension in the seat belt in a crash situation is much larger than in normal operation. If the hub 22 was designed to carry all of this tension, it would not flex enough to properly function as a strain gage sensor. Therefore, in a crash situation, the limit structure carries the tension through the much stronger limit structure 11. As the tension in the seat belt increases, the hub 22 rotates or tilts until rim 25 contacts flange 16 providing a positive stop. The seat belt tension is then transferred through buckle plate 46 to rim 25, flange 16, bolt 54 and then to the vehicle floor or seat frame 8. The limit structure 11 is designed so as not to deform under the load placed on it by the seat occupant during a crash situation.

Remarks About The Preferred Embodiments

The seat belt tension sensor has several advantages. It allows accurate sensing of seat belt tension, while at the same time providing the structural strength needed for occupant restraint in a crash situation. The seat belt tension sensor allows an airbag controller to make better decisions as to when and how to deploy and airbag based upon more accurate seat occupant information. In the case of a child's car seat being strapped into a car seat, the seat belt tension sensor in conjunction with a seat weight sensor allows the airbag controller to properly compute that the seat occupant has a low weight and to prevent deployment of the airbag.

The gap between the hub and the housing flange is the travel range of the sensor as it is actuated. This design solves four main problems. 1) Maintaining sensitivity at low loads without damage at higher loads. 2) Maintaining restraint system integrity. 3) Integration into multiple restraint systems. 4) Reading correctly over a wide range of strain angles. A theta angle represents rotation about the axis of the bolt. An alpha angle represents tilt toward and away from the seat.

1) Maintaining Sensitivity at Low Loads without Damage at Higher Loads.

When the gap between the rim and the flange is closed the load applied to the strain sensor elements reaches its limit. After this, the load is transferred to the bolt. Limiting the maximum load applied to the strain sensor is necessary since the working range of the sensor is generally below 100-lbs. but the sensor must withstand large (often greater than 1000-lb.) loads without damage and must not compromise the integrity of the passenger restraint system.

Springs 36 can be omitted if desired. Springs 36 are added to allow larger motions. These springs apply a load, which holds the hub 22 in place until a designed actuation force is reached. Once this force is exceeded the springs allow the hub to move. This both limits the load applied and allows the tolerances between the limit structure 11 and the shoulder bolt 54 to be looser.

2) Maintaining Restraint System Integrity.

The present design allows the use of the same or very similar mounting bolts and anchors and mounting technique as do current seatbelt attachment methods. Thus, safety engineers are very familiar with the requirements of the attachment method and installation procedures are changed as little as possible.

3) Integration into Multiple Restraint Systems.

This present invention allows the sensor to be attached at the most common point of a wide variety of belt systems. It is useable even with very short bolt to buckle distances. The only changes required in some installations are a larger mounting hole in the anchor and a longer bolt to allow for the thickness of the device. The shoulder bolt is used as the stop. A tube through which the bolt passes could also be used as a stop. The advantage of this design is that it does not require a shoulder bolt with the correct shoulder length and diameter for the device to operate. A standard bolt may be used. This improves field serviceability.

4) Reading Correctly over a Wide Range of Theta and Alpha Angles.

Theta represents rotation about the axis of the bolt. Alpha represents tilt toward and away from the seat. The attachment to the floor may be fixed or, more likely, the sensor would be free to rotate and tilt plus or minus several degrees. This freedom of movement allows the sensor to respond only to tension on the seatbelt while accommodating user needs. The cross-style sensor design allows the tension load to be applied at a fairly wide range of theta angles with only small changes in sensitivity. This allows the sensor to rotate (theta) normally to accommodate passenger needs. If desired, the sensor can rotate around the bolt axis in order that its sensing elements could remain aligned with the direction of the pull throughout the normal rotation limit of the anchor. This could allow the use of simplified sensor element designs.

The sensor 21 may also be shaped such that only tension is sensed and compression is ignored. This is accomplished by removing one or more arms 27 on the "top" side of the sensor. In the event that the angle of tension application is desired, the sensor can be constructed so that the alpha angle is reported as if it were tension. Or, another separate strain gage or potentiometric sensors or the like can be used to report the angle(s) (alpha and/or theta) at which the tension load is applied.

First Alternative Embodiment

Figure 4:
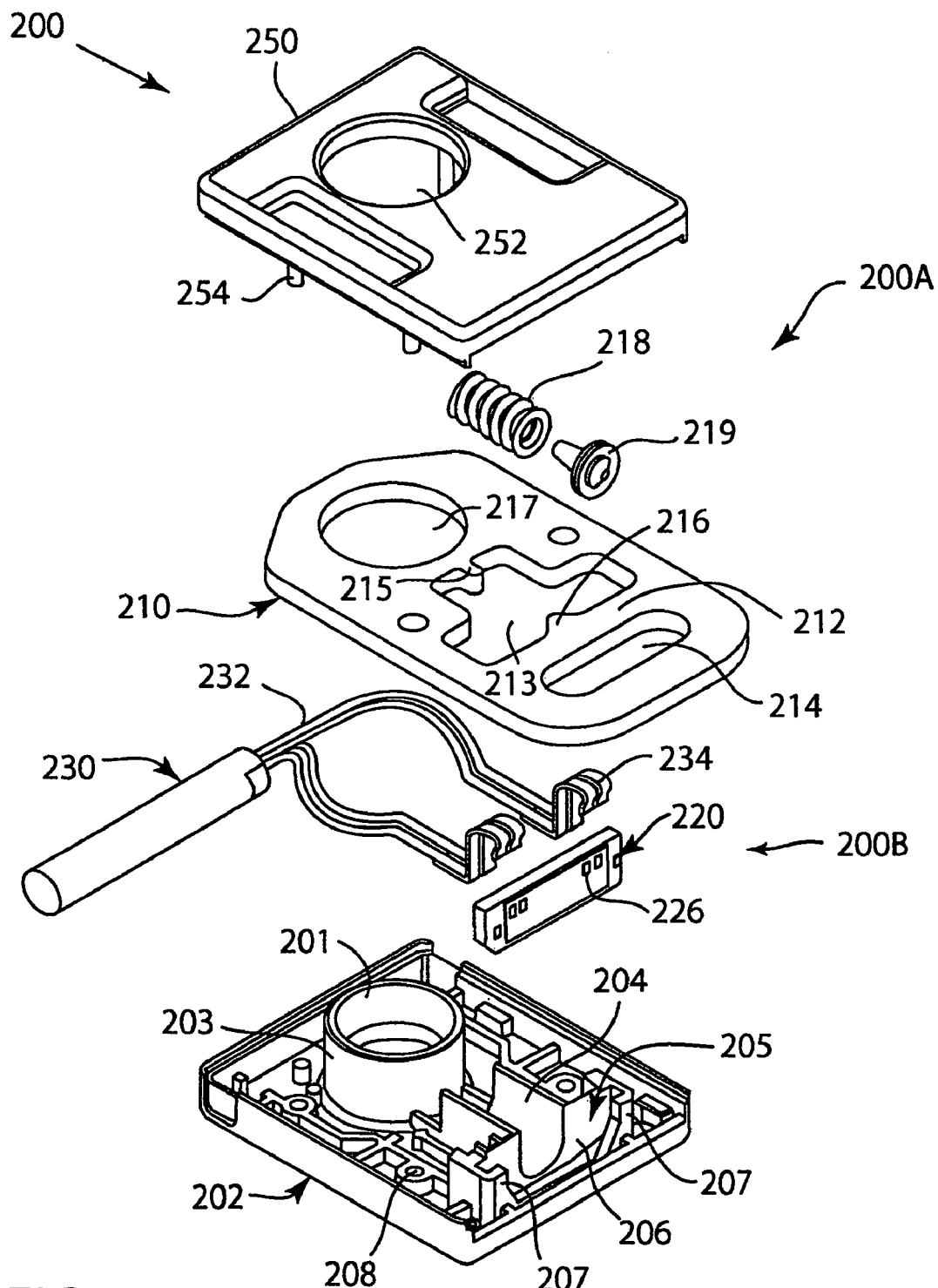
FIG. 4 is a perspective exploded view of an alternative embodiment of a seat belt tension sensor.
Figure 5:
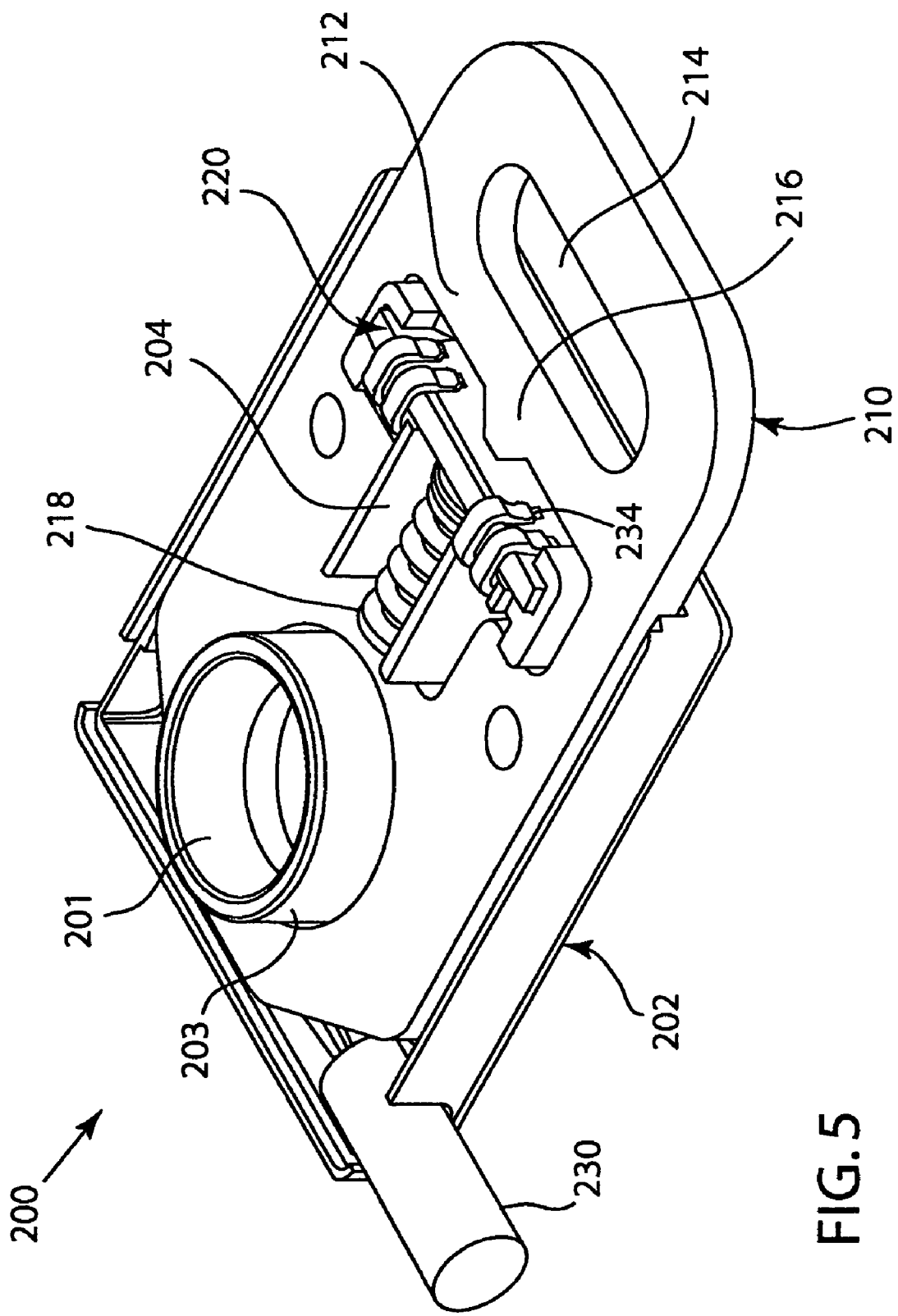
FIG. 5 is a perspective assembled view of FIG. 4 without the cover.
Figure 6:
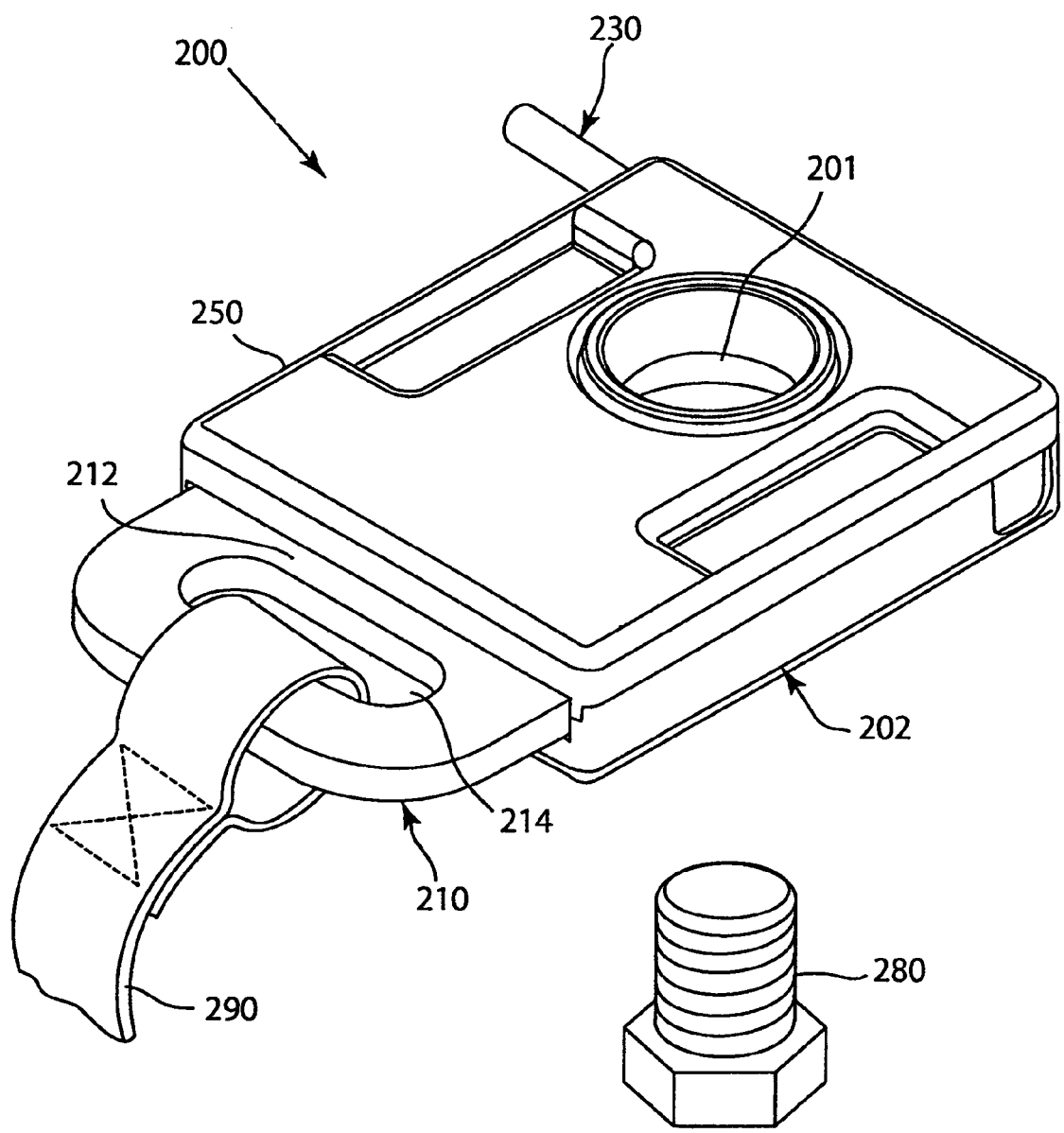
FIG. 6 is a perspective assembled view of FIG. 4 with the cover.

Referring to FIGS. 4-6 there is an alternative embodiment of a seat belt tension sensor assembly 200 shown. Assembly 200 comprises a limit structure 200A and a sensor 200B. Limit structure 200A includes a housing 202, an anchor plate 210, a cover 250, and a strain sensor or member 220. Housing 202 has an aperture 201, flange 203, spring channel 204, walls 206 and 207 that define a strain member slot 205 and holes 208. Anchor plate 210 is loosely fitted within housing 202. Anchor plate 210 includes an arm 212 extending between a first cutout 213 and a second cutout 214. Seat belt webbing 290 is attached through cutout 214. A pair of projections 215 and 216 extend into first cutout 213. A mounting hole 217 is provided in anchor plate 210. A spring 218 is mounted in channel 204. One end of spring 218 is mounted over projection 215. Sensor 200B has a strain member 220 that is mounted in slot 205. A support 219 fits into spring 218. Support 219 rests adjacent a surface of strain member 220 and serves to even out the forces from spring 218 on strain member 220. Spring 218 is pre-compressed between anchor plate 210 and strain member 220 such that support 219 is urged against strain member 220. Spring 18 is preferably pre-compressed to 35 pounds of force.

A wire harness 230 has several wires 232 that end in terminals 234. Terminals 234 clip over connector pads 226 on member 220. A cover 250 has a hole 252 and projections 254. Projections 254 mate with holes 208 to snap fit cover 250 to housing 202. Seat belt tension sensor 200 is attached to a vehicle floor (not shown) by a fastener 280 such as a bolt. Fastener 280 goes through holes 201, 217 and 252.

Figure 7:
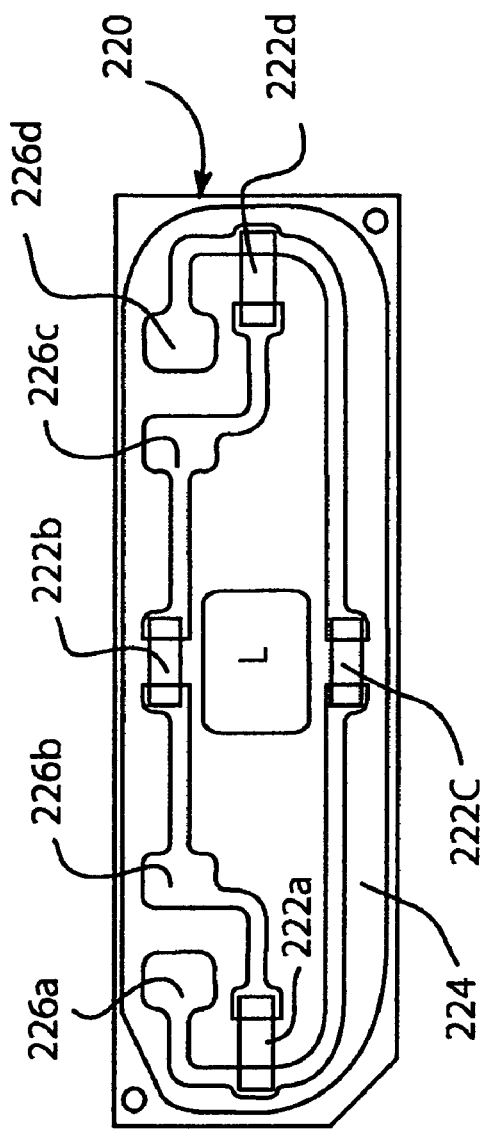
FIG. 7 is a side view of the strain member.
Figure 8:
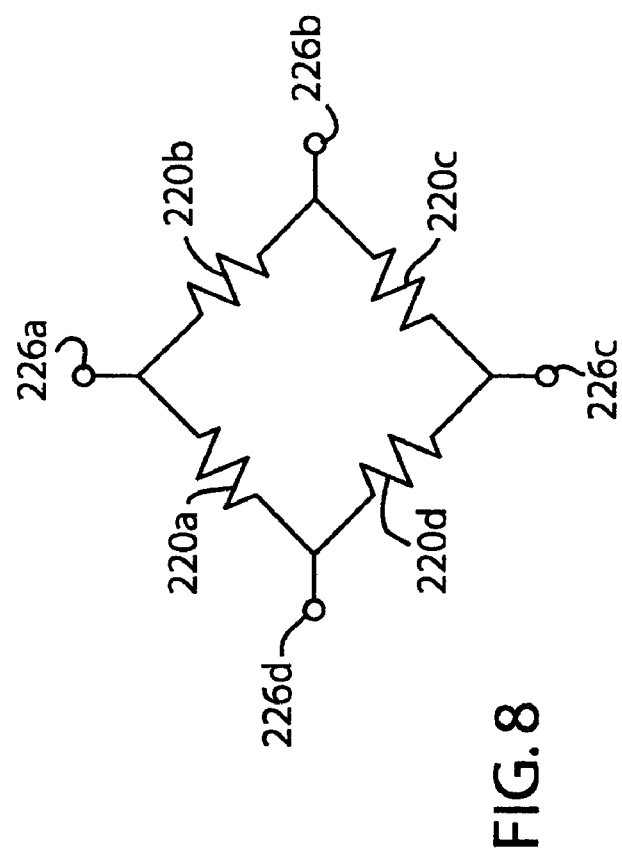
FIG. 8 is a schematic diagram of the wheatstone bridge circuit.
Figure 10:
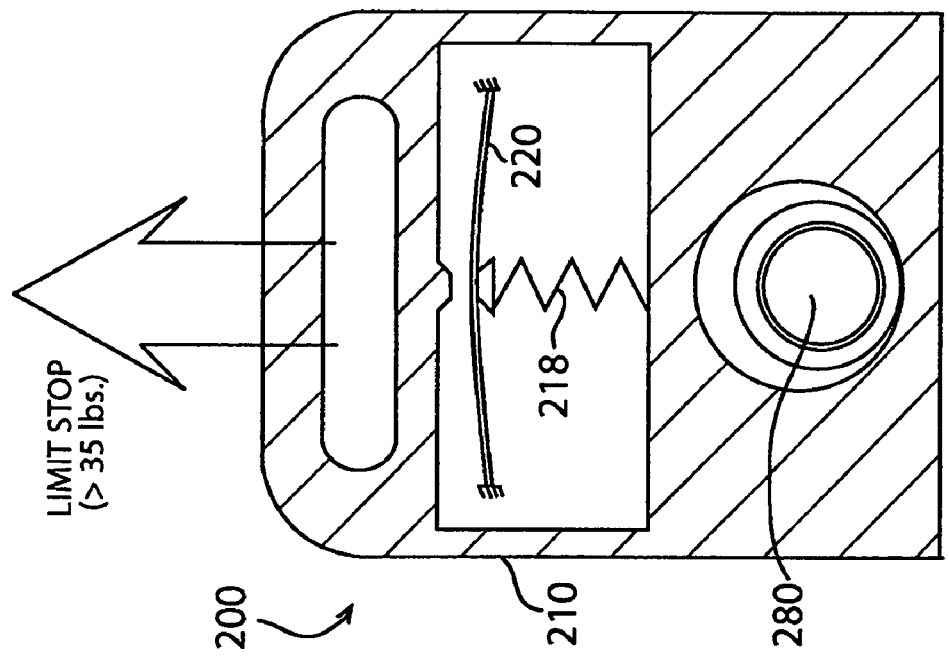
FIG. 10 is a side view of the seat belt tension sensor of FIG. 5 showing a fully loaded state.
Figure 9:
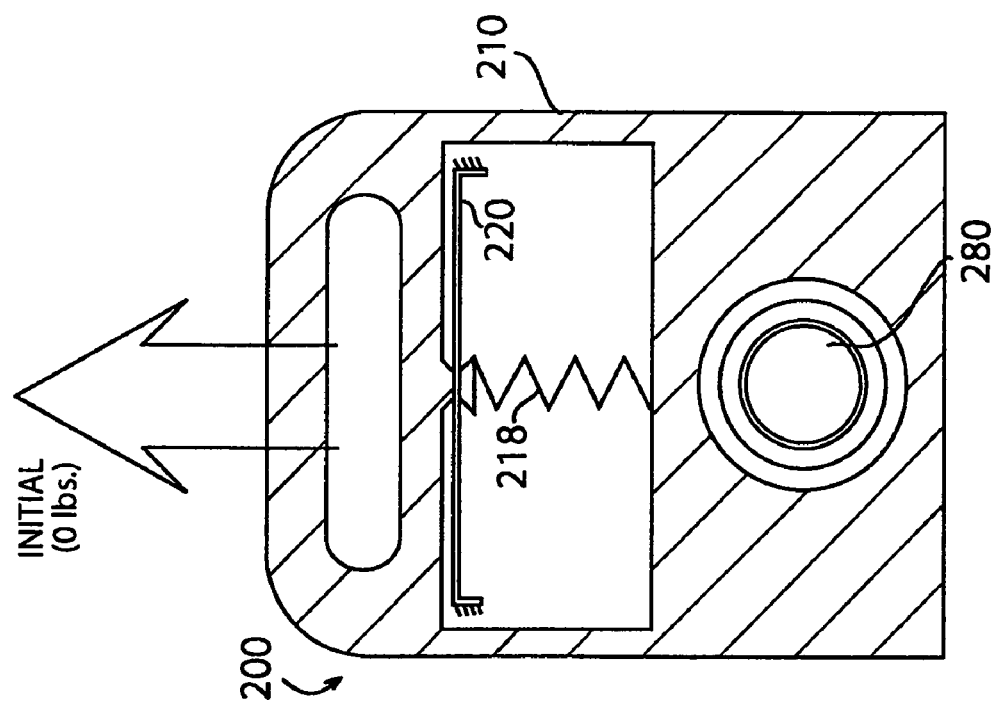
FIG. 9 is a side view of the seat belt tension sensor of FIG. 5 showing an unloaded state.

Strain member 220, shown in FIGS. 7 and 8, is formed of a material capable of carrying the tension applied by spring 218 when the seat belt is tightened. Preferably, the strain member 220 is formed of 430 stainless steel. The strain member 220 includes stain sensitive resistors 222*a,b,c,d* formed thereon. These are formed by first screening a dielectric layer 224 onto the steel. The strain member 220 is then kiln fired at 850° C. Next, electrically conductive traces 225 and connector pads 226*a,b,c,d* are similarly screened onto the strain member 220. The strain member 220 is again kiln fired at 850° C. The strain sensitive resistors 222*a,b,c,d* are next screened onto the strain member 220 in positions defined by the electrically conductive traces 225. The strain member 220 is again kiln fired at 850° C. At this point, a final coating of a covercoat or epoxy can be applied to protect the electrical components of strain member 220. This coating is not required, but may be desirable in circumstances where high abrasion or contaminants are expected. It should be noted that the strain sensitive resistors 222*a,b*, c,d and connector pads 226a,b,c,d together form the Wheatstone bridge circuit of FIG. 8.

Turning to FIGS. 4-5, and 9-10, when a tension is applied to seat belt 290, anchor plate 210 causes spring 218 to apply pressure to the center of the strain member 220. As the tension increases, the strain sensitive resistors 222 will change resistance resulting in an electrical output signal that changes in proportion to the amount of strain in seat belt 290. This electrical signal is provided to an external electrical circuit by wire harness 230.

In a collision situation, the force applied to the seat belt overcomes the spring resistance and anchor plate 210 moves to rest against flange 203. Fastener 280 passes through hole 201 and is adjacent to flange 203. The force from the seat belt is transferred to fastener 280 which is attached to a vehicle floor. Thus, the force is transferred form the seat belt to the vehicle floor. In this way, no further tension is applied to the strain member 220 and the strain member 220 is thus protected from excessive forces by limit structure 220A.

Figure 11:
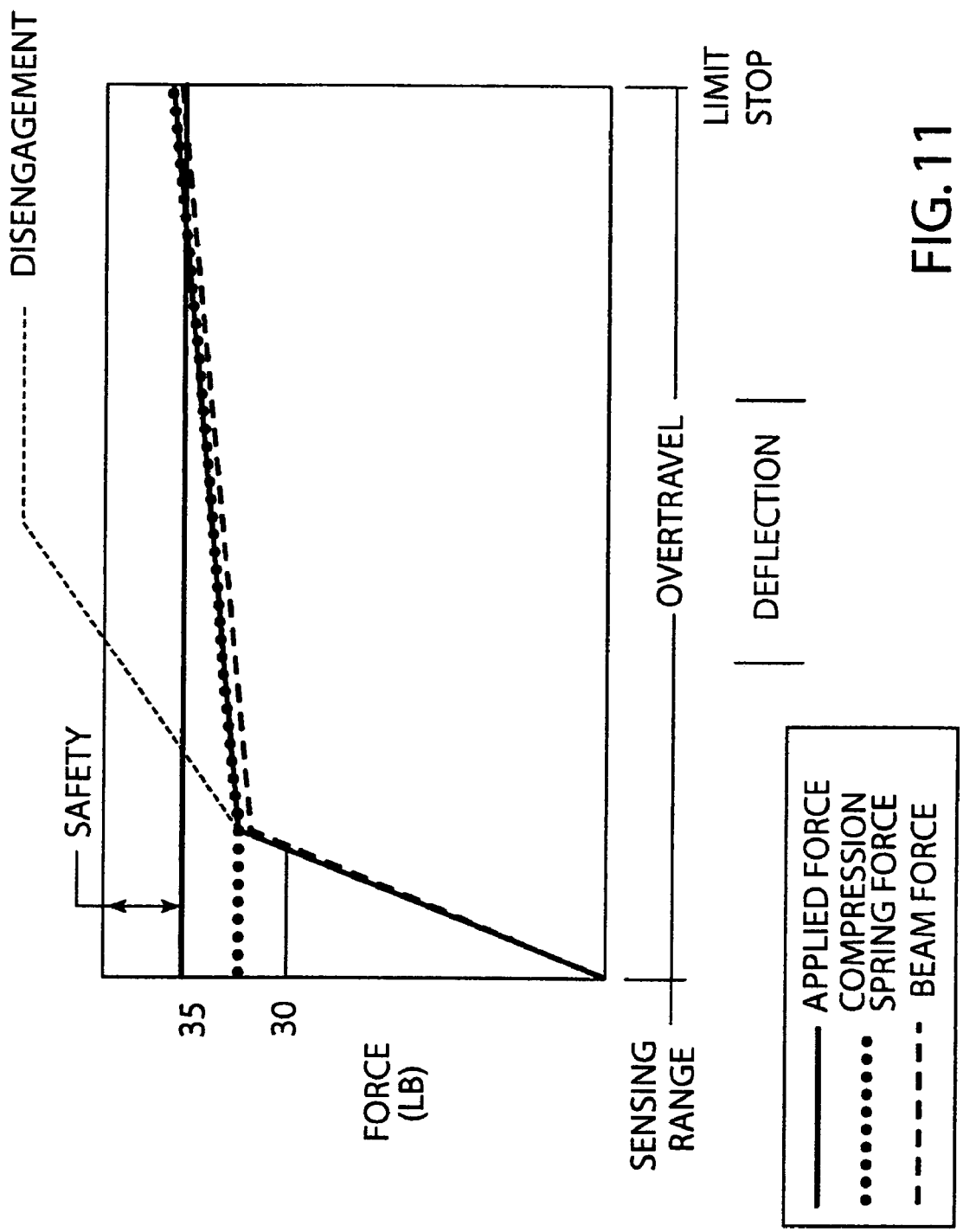
FIG. 11 is a graph of force versus travel for the seat belt tensor sensor of FIG. 5.

A graph showing force versus travel for sensor 200 is provided in FIG. 11. Note that the graph varies linearly up to the point of overtravel at which point it flattens indicating and overtravel condition. The output limit is set for the point at which the fastener 280 engages against the anchor plate 210.

Second Alternative Embodiment

Figure 12:
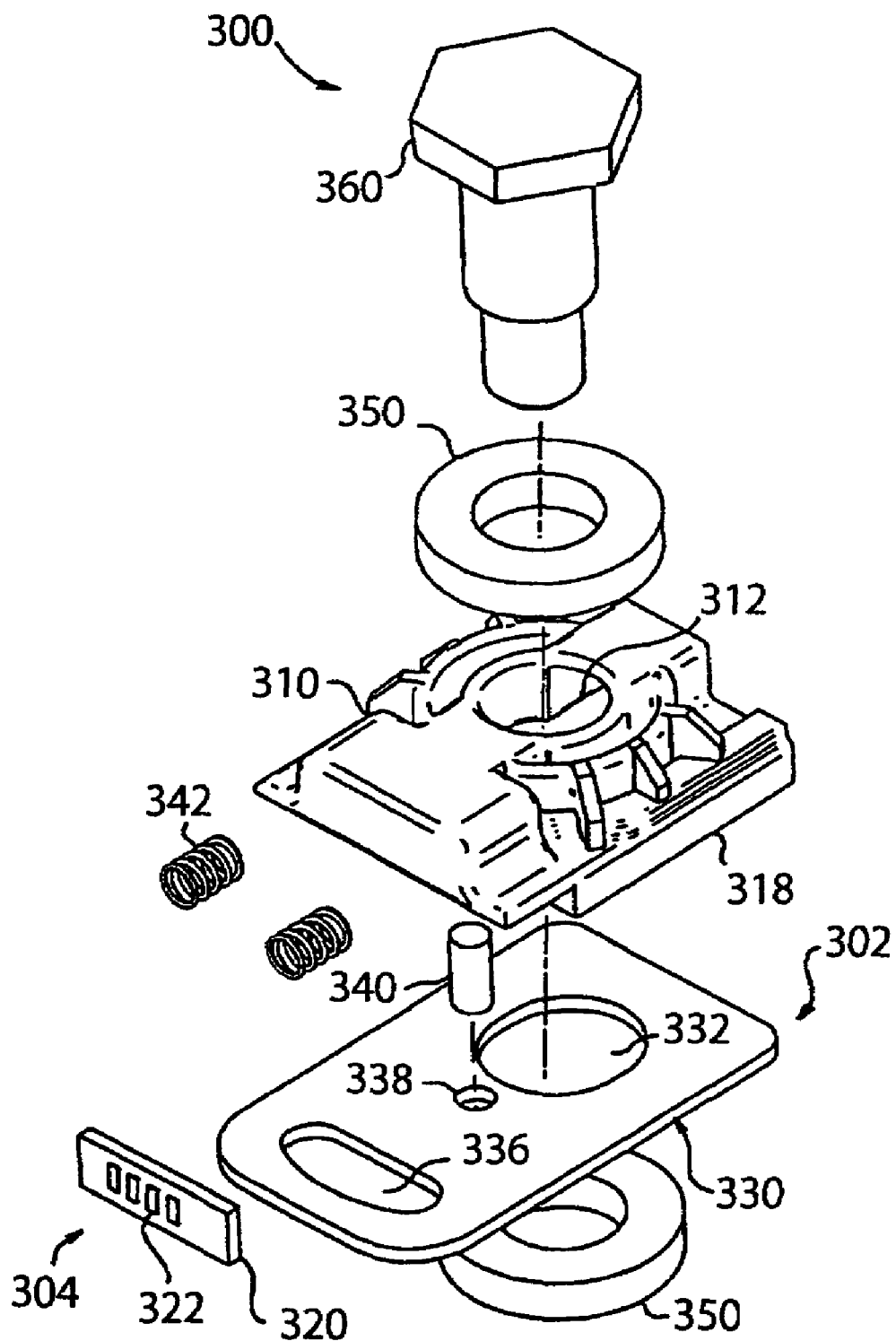
FIG. 12 is an exploded view of an alternative embodiment of a seat belt tension sensor.
Figure 13:
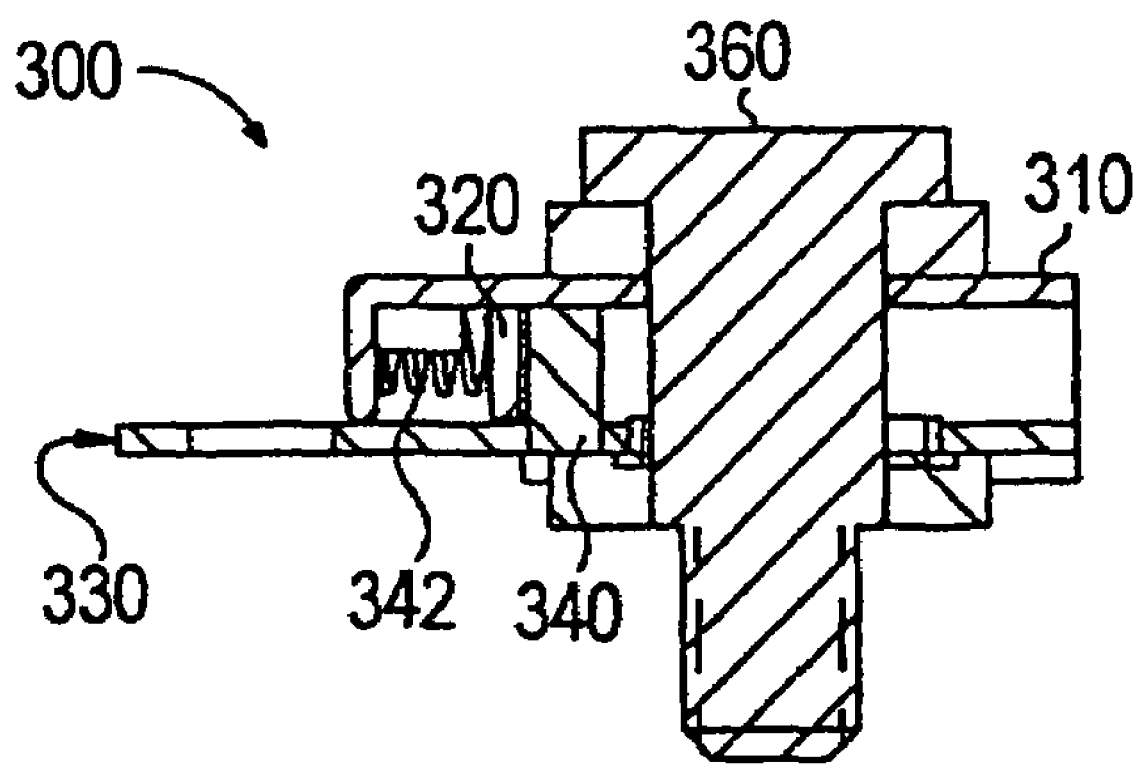
FIG. 13 is a cross-sectional view of the seat belt tension sensor of FIG. 12.
Figure 14:
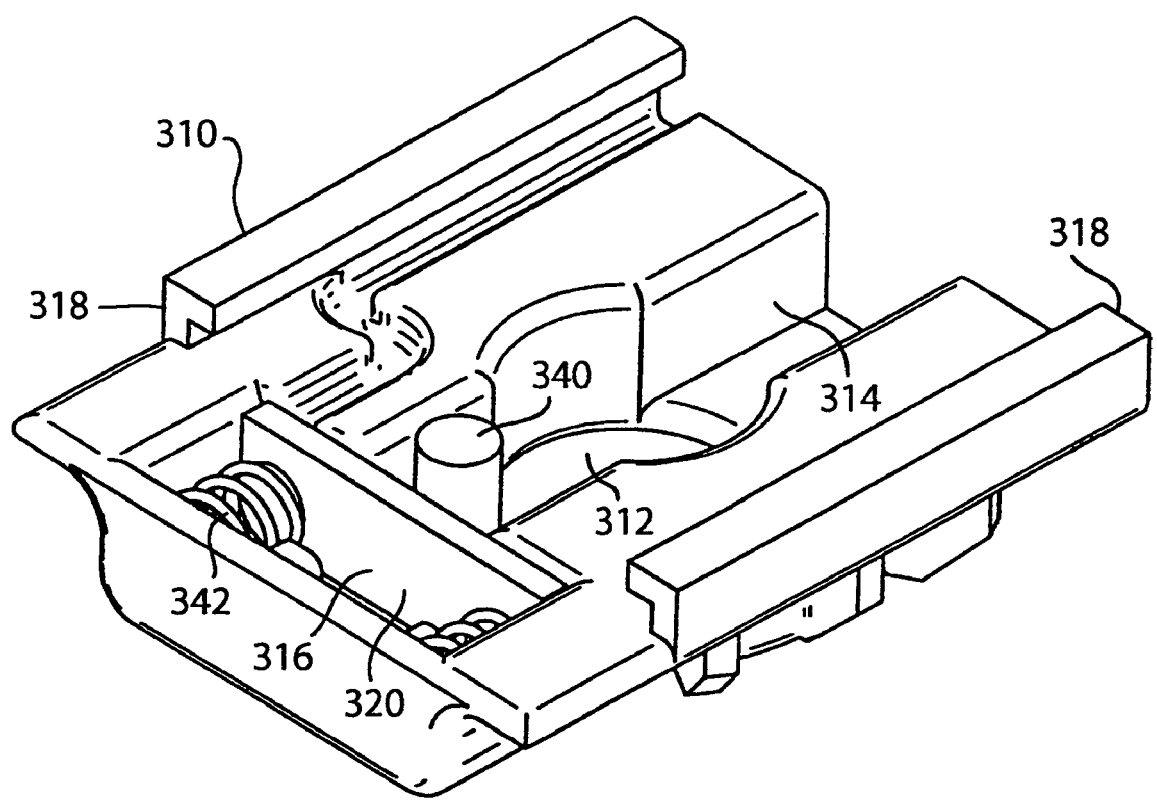
FIG. 14 is a perspective view of the seat belt tension sensor of FIG. 12.

FIGS. 12-14 show another seat belt tension sensor assembly 300. Assembly 300 comprises a limit structure 302 and a sensor 304. Limit structure 302 includes a housing 310, an anchor plate 330, an actuator pin 340 and bolt 360. Housing 310 has an aperture 312, a channel 314, rails 318 and strain member slot 316. Anchor plate 330 is slidably retained within housing 310 by rail 318. Anchor plate 330 includes a cutout 336, a hole 338 and a mounting hole 332. Seat belt webbing would be attached through cutout 336. A pair of springs 342 are mounted in slot 316. Sensor 304 has a strain member 320 with resistors 322 that are mounted in slot 316. Actuator pin 340 rests against the backside of strain member 320. A pair of foam washers 350 are included in the installation of the sensor to reduce vibration noise and allow axial off set loads. The foam washers allow the seat belt tension sensor to flex slightly depending on the direction of pull on the seat belt webbing.

Seat belt tension sensor 300 is attached to a vehicle floor or seat (not shown) by a fastener 360 such as a bolt. Fastener 360 goes through holes 312 and 332.

Strain member 320 is similar to strain member 220, shown in FIGS. 7 and 8. When a tension is applied to the seat belt webbing, anchor plate 330 causes pin 340 to apply pressure to the center of the strain member 320. As the tension increases, the strain sensitive resistors 322 will change resistance resulting in an electrical output signal that changes in proportion to the amount of strain in the seat belt. This electrical signal is provided to an external electrical circuit by a wire harness (not shown).

In a collision situation, the force applied to the seat belt overcomes the spring resistance and anchor plate 330 moves to rest against bolt 360. The force is transferred form the seat belt to the vehicle floor. In this way, no further tension is applied to the strain member 320 and the strain member 320 is thus protected from excessive forces by limit structure 302.

Third Alternative Embodiment

Figure 15:
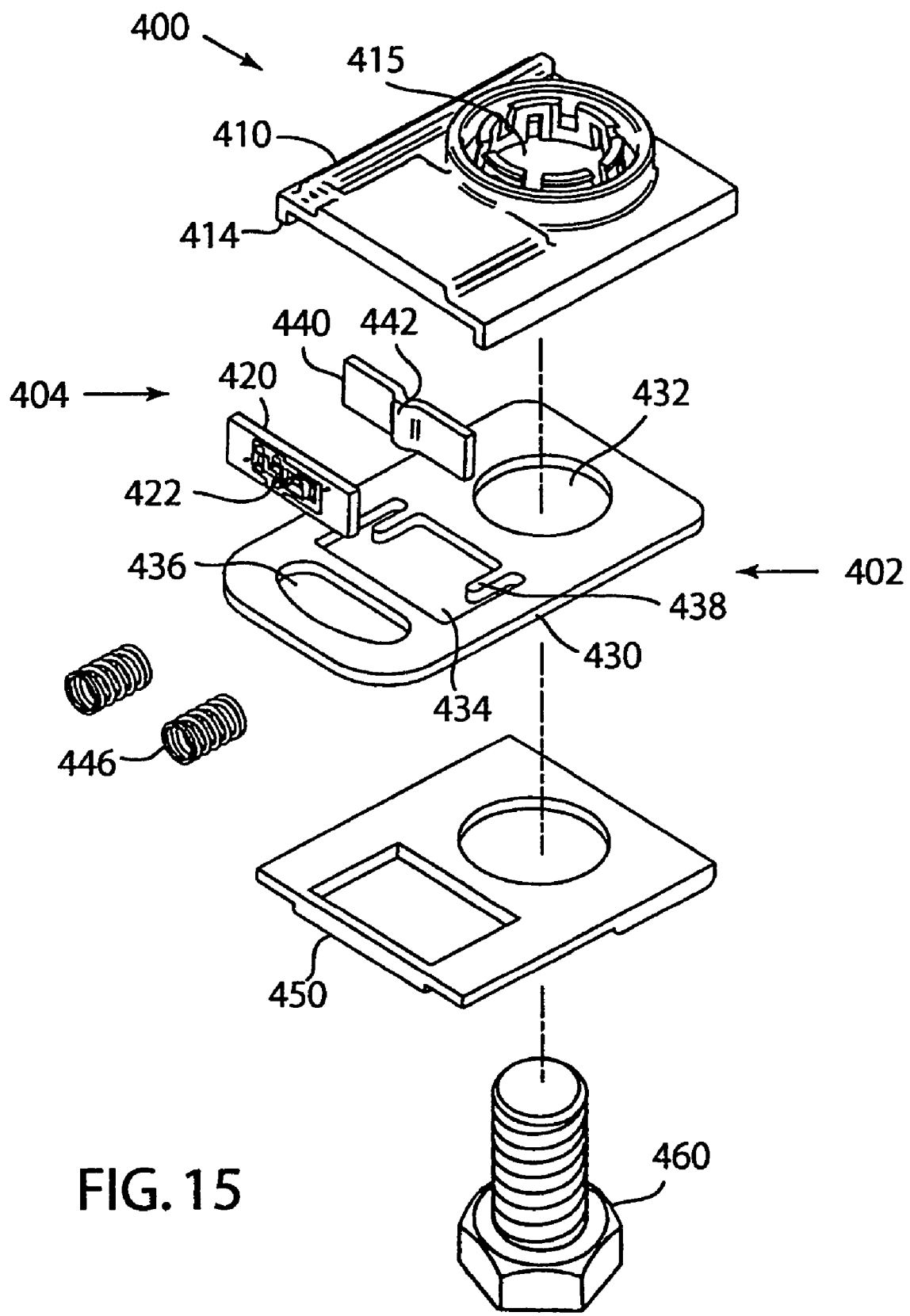
FIG. 15 is an exploded view of an alternative embodiment of a seat belt tension sensor.
Figure 16:
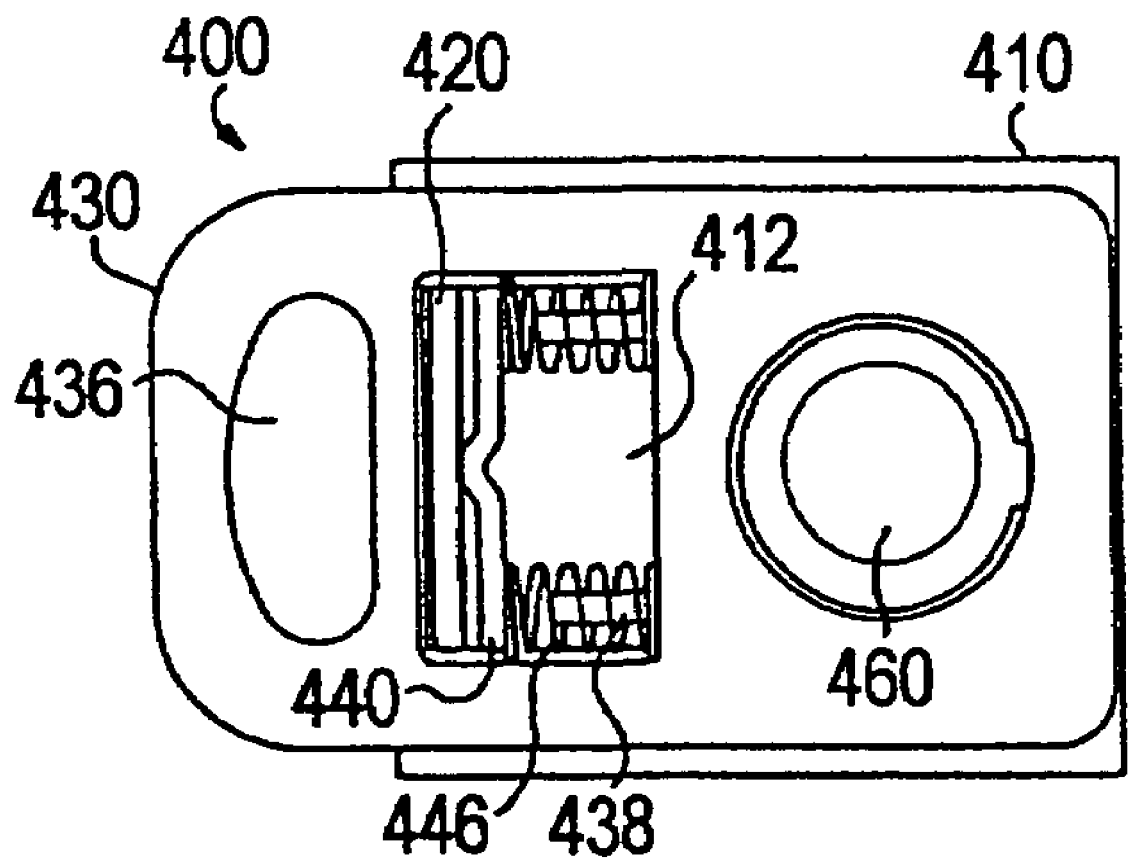
FIG. 16 is a top view of the seat belt tension sensor of FIG. 15.
Figure 17:
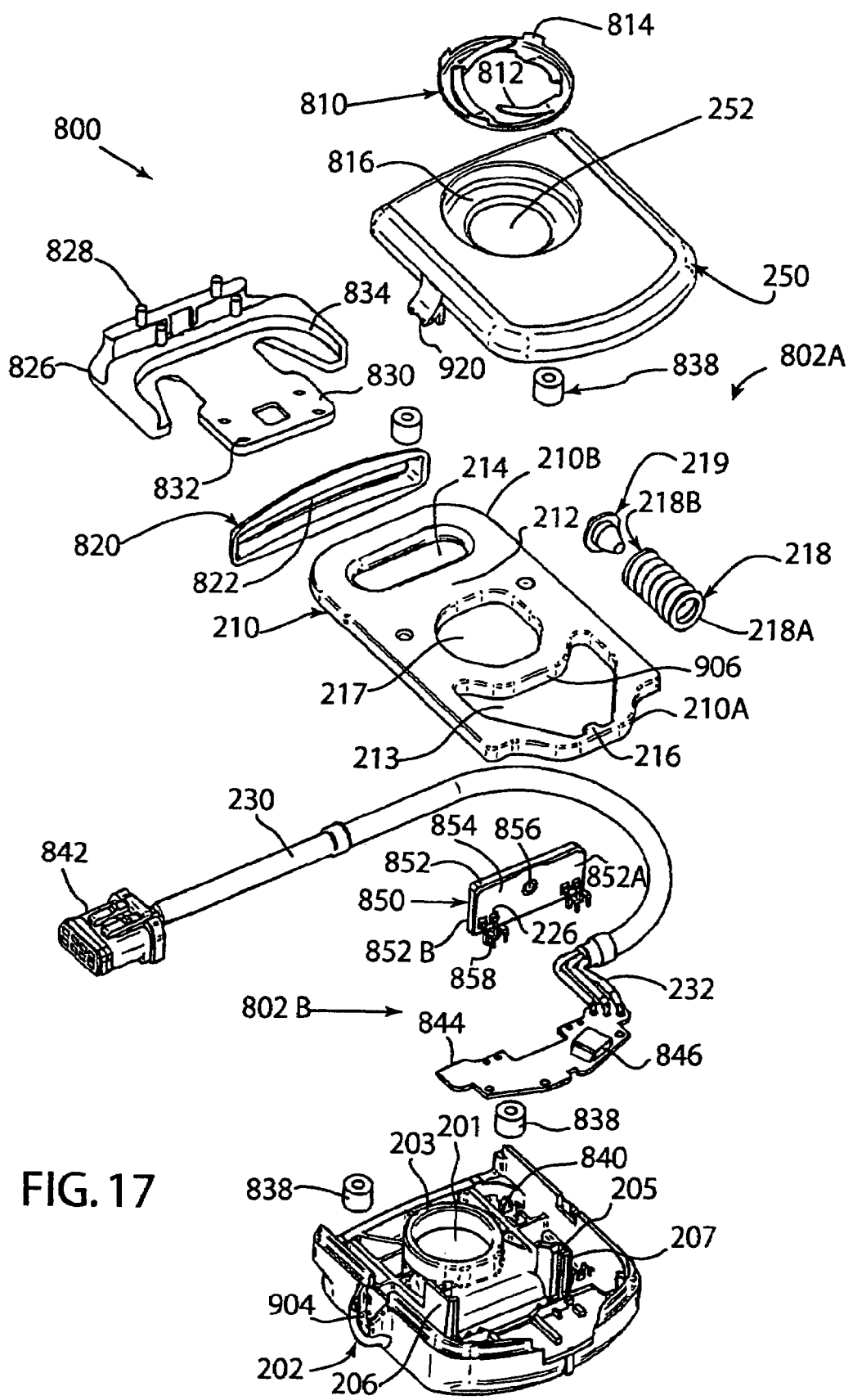
FIG. 17 is a perspective exploded view of the preferred embodiment of a seat belt tension sensor.
Figure 18:
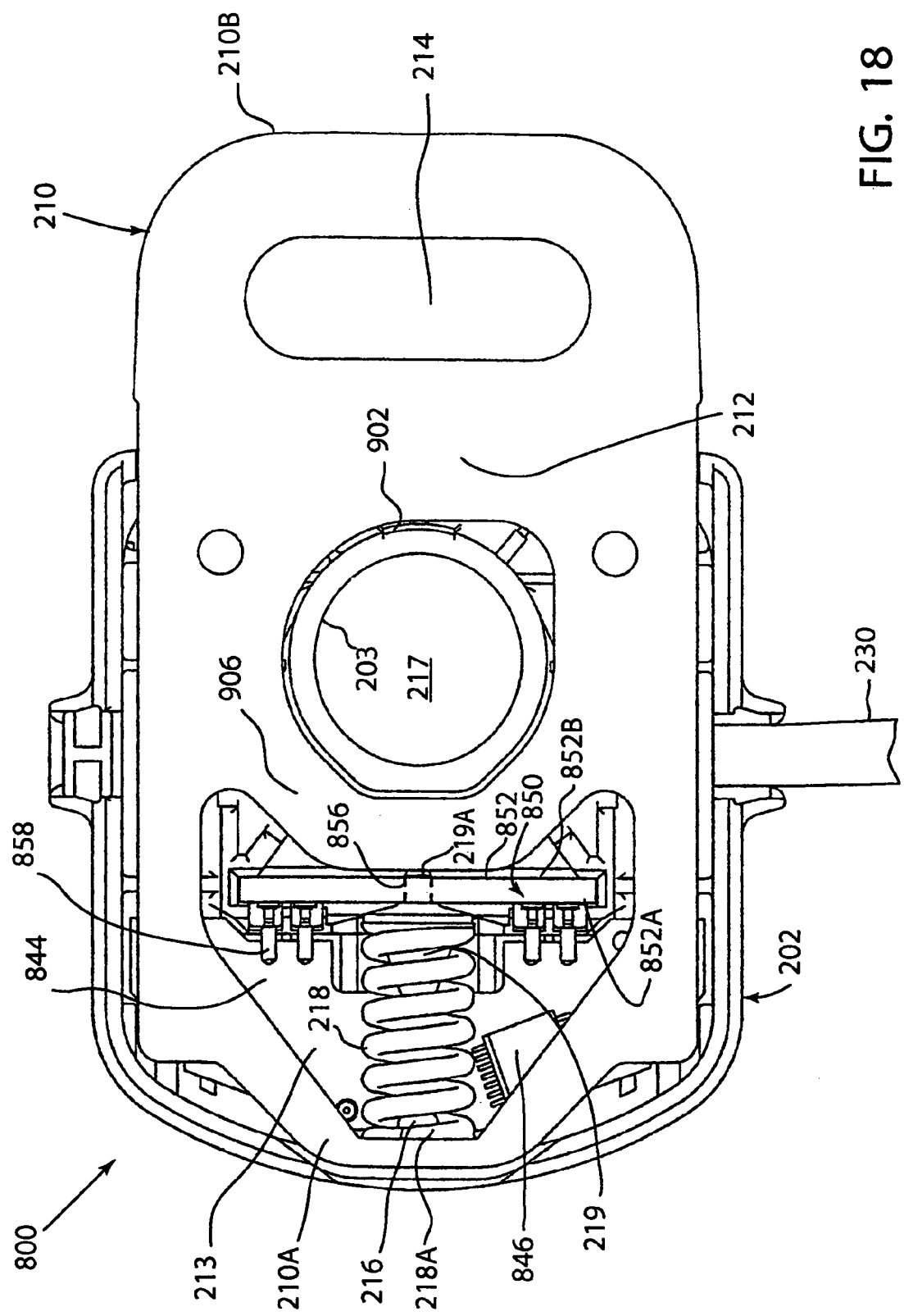
FIG. 18 is a top assembled view of FIG. 17 without the cover.
Figure 19:
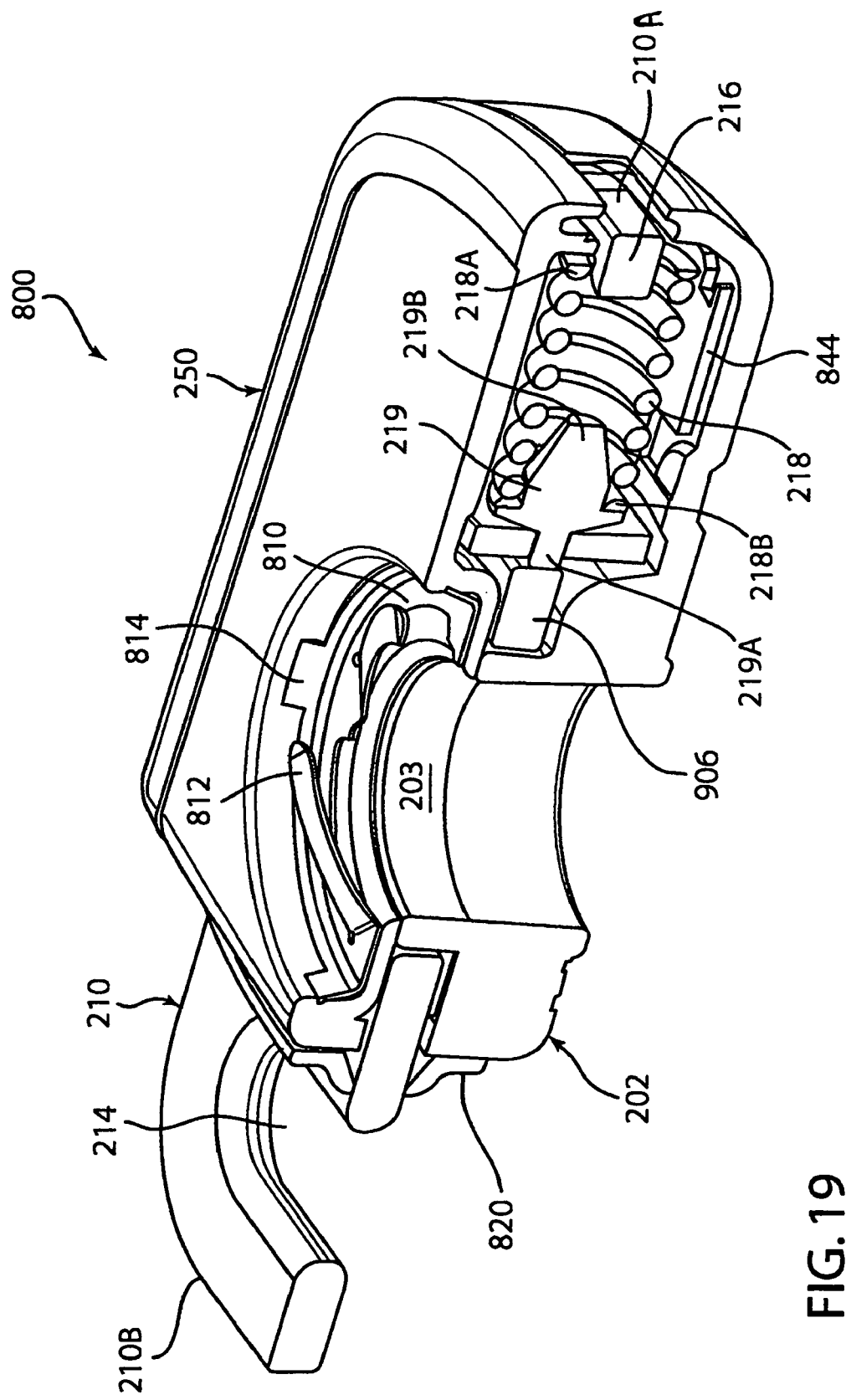
FIG. 19 is a cross-sectional view of FIG. 17 in an assembled state.
Figure 20:
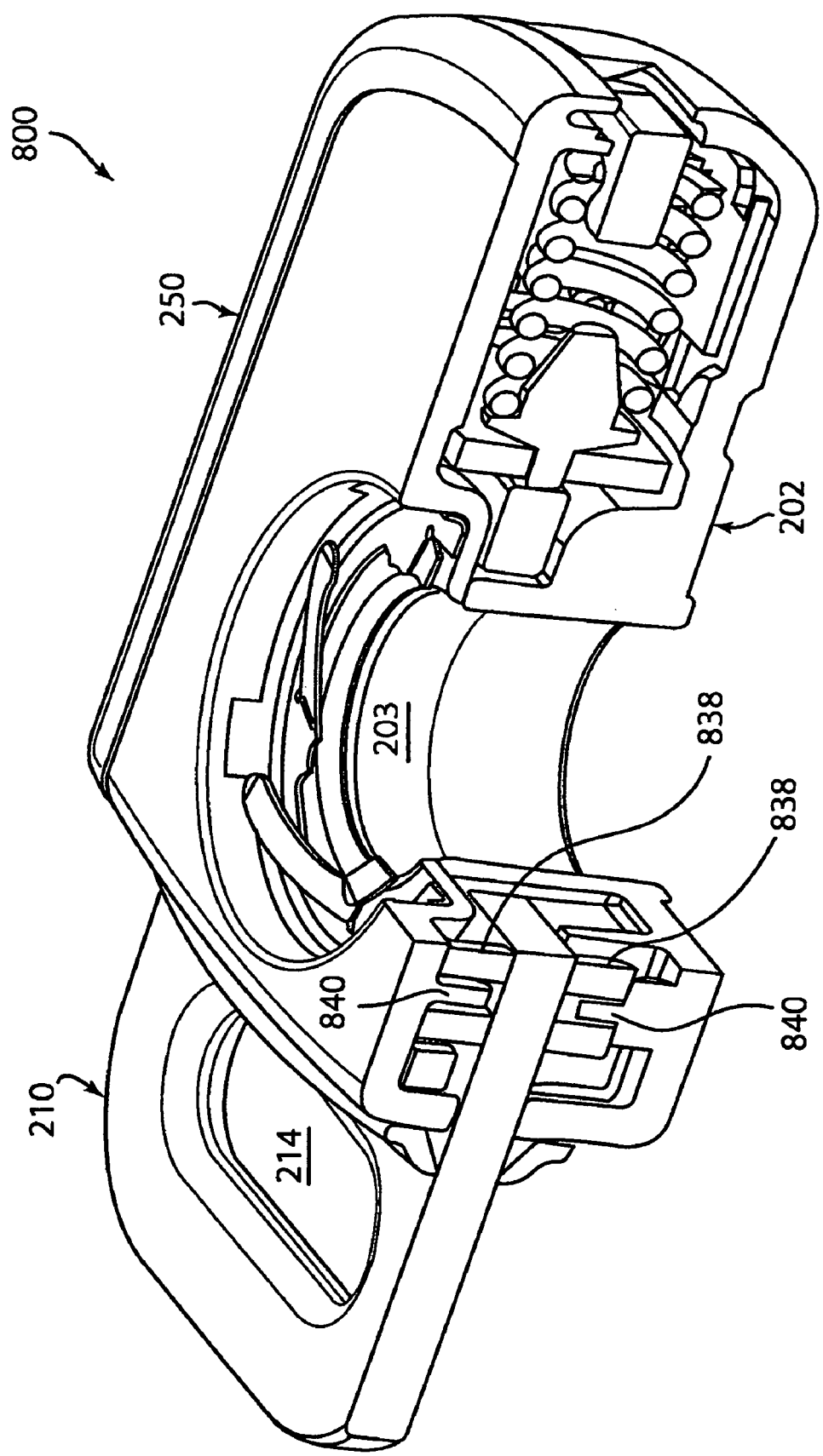
FIG. 20 is another cross-sectional view of FIG. 17 in an assembled state showing the elastomeric washers.
Figure 21:
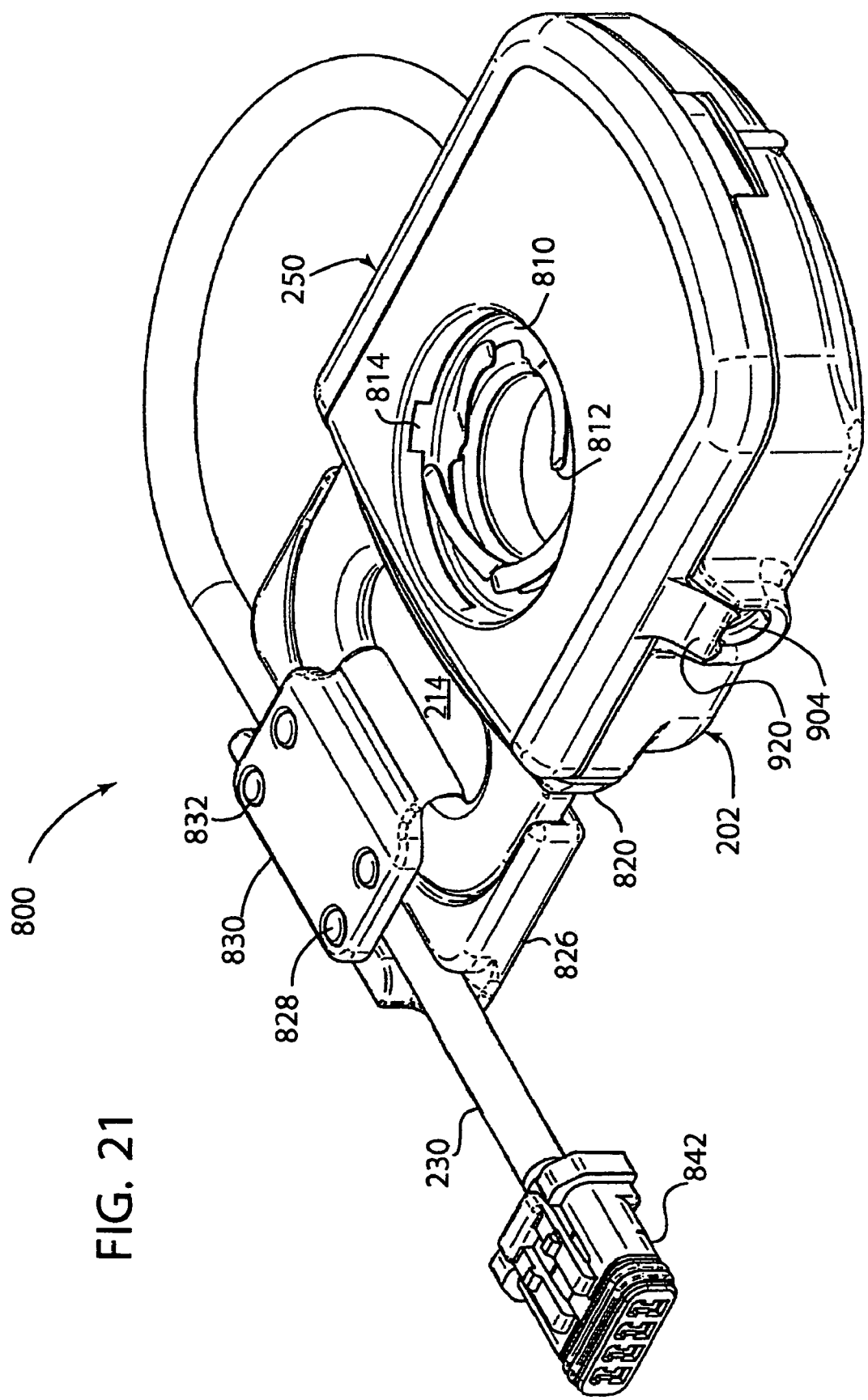
FIG. 21 is a perspective assembled view of FIG. 17
Figure 22:
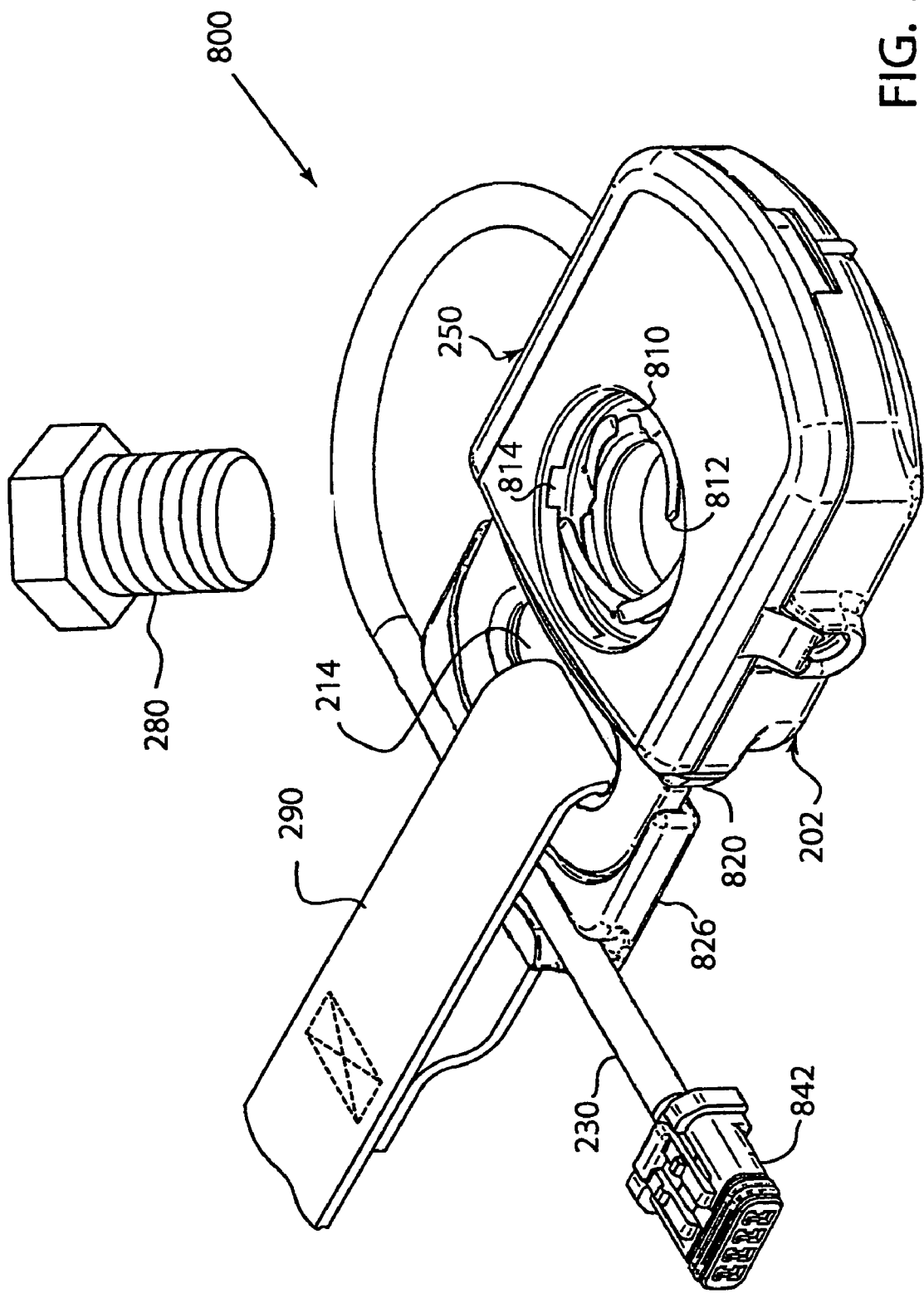
FIG. 22 is a view of FIG. 20 with the seat belt and bolt added.

FIGS. 15-16 show another seat belt tension sensor assembly 400. Assembly 400 comprises a limit structure 402 and a sensor 404. Limit structure 402 includes a housing 410, a anchor plate 430, an actuator bar 440, cover 450 and bolt 460. Housing 410 has an aperture 412 and rails 414. Anchor plate 430 is slidably retained within housing 410 by rails 414. Anchor plate 430 includes a first cutout 436, a second cutout 434, a pair of projections 438 and a mounting hole 432. Seat belt webbing would be attached through cutout 436. A pair of springs 446 are mounted in over projections 438. Sensor 404 has a strain member 420 with resistors 422 that are mounted in cutout 434. Actuator 440 has a bump 442 that rests against the backside of strain member 420. Several fingers 416 are attached to housing 410 around hole 415. The fingers grip around fastener 460 and allow axial off set loads. The fingers 416 allow the seat belt tension sensor to flex slightly depending on the direction of pull on the seat belt webbing.

Seat belt tension sensor 400 is attached to a vehicle floor or seat (not shown) by a fastener 460 such as a bolt. Fastener 460 goes through holes 415 and 432.

Strain member 420 is similar to strain member 220, shown in FIGS. 7 and 8. When a tension is applied to the seat belt webbing, anchor plate 430 compresses spring 446 to apply pressure to actuator 440 that allows bump 442 to apply pressure to the center of the strain member 420. As the tension increases, the strain sensitive resistors 422 will change resistance resulting in an electrical output signal that changes in proportion to the amount of strain in the seat belt. This electrical signal is provided to an external electrical circuit by a wire harness (not shown).

In a collision situation, the force applied to the seat belt overcomes the spring resistance and anchor plate 430 moves to rest against bolt 460. The force is transferred form the seat belt to the vehicle floor. In this way, no further tension is applied to the strain member 420 and the strain member 420 is thus protected from excessive forces by limit structure 402.

Variations of the Preferred Embodiments

The sensor shown was several strain gage resistors, one skilled in the art will realize that the preferred embodiment would work with other types of sensors. For example, discrete chip resistors could be attached or foil type strain gages could be used. Furthermore, the shape of the sensor could be varied to any configuration that would transfer the weight from the seat belt.

Another variation of the seat belt tension sensor would be to utilize other electrical connections other than a wire harness. For example, a connector or terminals could be added.

Yet, a further variation, would be to place signal conditioning circuitry on hub 22 or strain member 200 to amplify and filter the electrical signal before it is transmitted to the airbag controller.

The seat belt tension sensor shown was mounted between a seat belt and a vehicle member. One skilled in the art will realize that the preferred embodiment could be mounted to various locations on the seat or vehicle interior. For example, the seat belt tension sensor could be attached to the vehicle roof.

The illustrated embodiment showed the use of the seat belt tension sensor in an automobile seat. It is contemplated to utilize the seat belt tension sensor in other occupant sensing applications such as chairs, sofas, scales, beds and mattresses, hospital equipment, cribs, airplane seats, train seats, boat seats, amusement rides, and theater seats.

Fourth Alternative Embodiment

Referring to FIGS. 17-25, there is a seat belt tension sensor assembly 800 shown. Assembly 800 comprises a limit structure 802A and a sensor 802B. Limit structure 802A includes a housing 202, an anchor plate 210 and a cover 250. Housing 202 has an aperture 201, flange 203, walls 206 and 207 that define a strain gage slot 205, posts 840, recess 904 and a reverse stop 902. Housing 202 is preferably molded from plastic. Anchor plate 210 is loosely fitted within housing 202. Anchor plate 210 has ends 210A and 210B. Anchor plate 210 includes an arm 212 extending between a cutout 213 and a slot 214. Seat belt webbing 290 is attached through slot 214. A projection 216 extends into cutout 213. A rib 906 extends into cutout 213 opposite to projection 216. A mounting hole 217 is provided in anchor plate 210. A spring 218 is mounted in cutout 213 between strain gage 850 and projection 216. Spring 218 has ends 218A and 218B. End 218A is mounted over projection 216.

Sensor 802B has a strain gage 850. Strain gage 850 has a substrate 852 that is mounted in slot 205. Substrate 852 has surfaces 852A and 852B. Substrate 852 has an aperture 856 that extends through the strain member and a cover coat 854. An actuator 219 fits into spring end 218B. Actuator 219 has a projection 219A and an end 219B. End 219B fits into spring end 218B. Projection 219A extends through aperture 856 of strain member 852. Projection 219A contacts rib 906. The spring 218 is pre-loaded or compressed during installation to a spring force of 35 pounds.

A wire harness 230 has several wires 232 that are connected to an electronic circuit assembly or printed circuit board 844. A connector 842 is connected to one end of wire harness 230. Wire harness 230 rests in recess 904 as it exits housing 202. Terminals 858 are soldered to connector pads 226 on strain gage 852. The other end of the terminals are soldered into printed circuit board 844. Printed circuit board 844 has electronic components such as signal conditioning electronics 846 mounted to it. The electronic circuit assembly takes the signal from the strain gage and filters and amplifies it before it is transmitted over the wire harness to an airbag controller or another electronic module.

Cover 250 has a hole 252 and recess 816. Cover 250 is ultrasonically welded to housing 202. An annular spring ring or washer 810 fits into recess 816. The spring ring 810 has several tines 812 that extend upwardly. Tangs 814 hold spring ring 810 in recess 816. Spring ring 810 reduces rattling and movement of the housing about the bolt 280 after the sensor is mounted. Spring ring 810 reduces noise in the vehicle interior by biasing the housing away from the bolt head toward the mounting surface.

A cable guide 826 is positioned over a portion of end 210B. Cable guide 826 holds wire harness 230 away from webbing 290. Cable guide 826 has a tab 830 that folds over wire harness 230. Holes 832 mate with posts 828 that are heat staked to hold tab 830 in place. The curved portion 834 fits over and partially covers end 210B. A seal or shield 820 slips over end 210B and rests against housing 202 and cover 250. Seal 820 has a slot 822 that the anchor plate 210 extends through. Seal 820 prevents contamination and liquids from entering the sensor. Cover 250 has a finger 920.

Posts 840 extend upwardly from housing 202 and downwardly from cover 250. A silicone or rubber grommet or washer 838 is mounted on each post 840. Washer 838 is located adjacent and in contact with anchor plate 210. Washer 838 prevents vibration and rattling of the anchor plate in the housing.

The seat belt tension sensor 800 is attached to a vehicle structure such as a seat or floor or B pillar (not shown) by a fastener 280 such as a bolt. Fastener 280 goes through holes 252, 217 and 201. Seat belt webbing 290 loops through slot 214 and is sewn in place. Webbing 290 would continue on to wrap around the waist of a vehicle seat occupant or a child seat.

Figure 23:
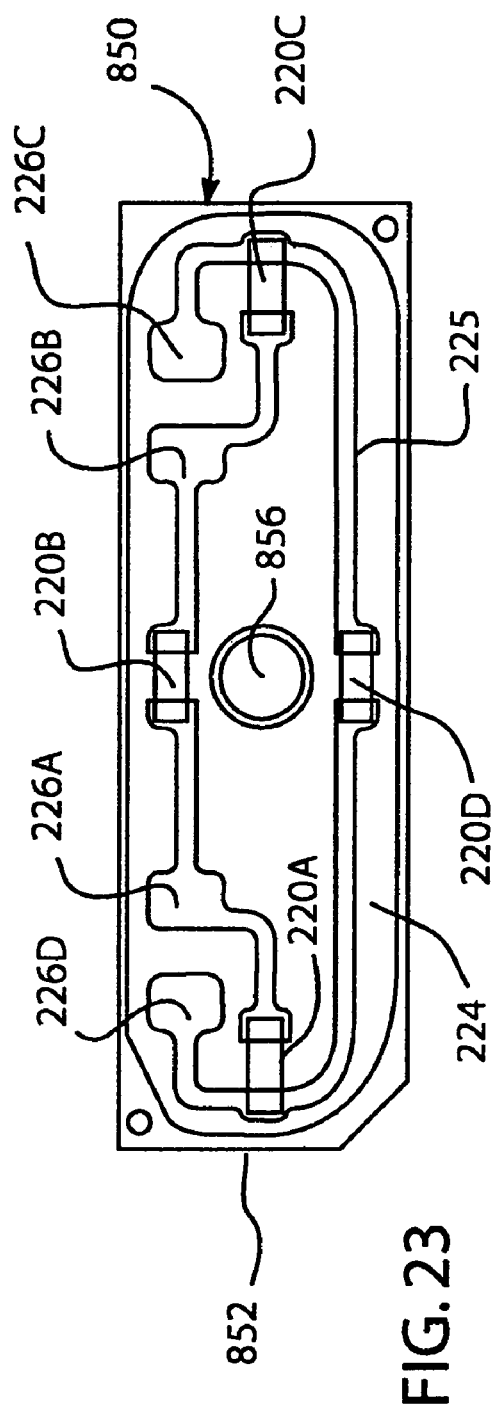
FIG. 23 is a front view of the strain gage.
Figure 24:
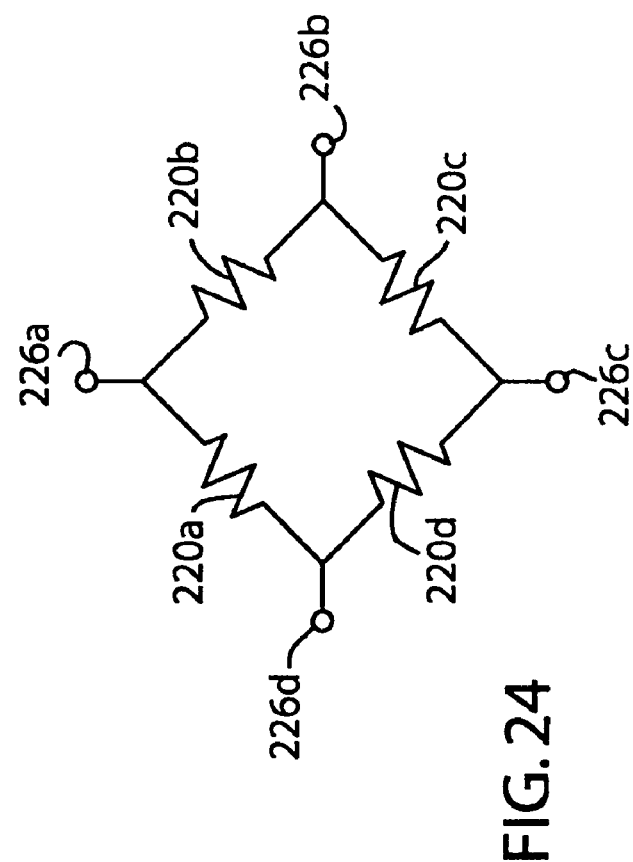
FIG. 24 is a schematic diagram of a wheatstone bridge.

Strain gage 850 is shown in further detail in FIGS. 23 and 24. Preferably, the substrate 852 is formed of 430 stainless steel. The strain gage 850 includes strain sensitive resistors 220a,b,c,d formed thereon. These are formed by first screening a dielectric layer 224 onto the steel. The substrate is then kiln fired at 850° C. Next, electrically conductive traces 225 and connector pads 226a,b,c,d are similarly screened onto substrate 852 and kiln fired at 850° C. The strain sensitive resistors 220a,b,c,d are next screened onto substrate 852 in positions defined by the electrically conductive traces 225 and kiln fired at 850° C. At this point, a final coating of a covercoat or epoxy can be applied to protect the electrical components. This coating is not required, but may be desirable in circumstances where high abrasion or contaminants are expected. It should be noted that the strain sensitive resistors 220a,b,c,d and connector pads 226a,b,c,d together form the Wheatstone bridge circuit of FIG. 24.

When a tension is applied to seat belt 290, anchor plate 210 causes spring 218 to apply force to the center of the substrate 852. As the tension increases, the strain sensitive resistors 220 will change resistance resulting in an electrical output signal that changes in proportion to the amount of tension in seat belt 290. This electrical signal is amplified and conditioned by electronic circuitry 844 and is then provided to an external electrical circuit such as an airbag controller by wire harness 230.

Details of the construction and operation of resistors 220 are shown in U.S. patent application Ser. No. 09/441,350, filed Nov. 15, 1999 and titled, "Automobile Seat Having Seat Supporting Brackets with a Stepped Weight Sensor".

The resistors are typically connected in a conventional wheatstone bridge configuration. Resistors 220 are strain sensitive and will change resistance based on the amount of strain placed on substrate 852.

The actuator projection 219A is in contact with rib 906 preventing direct contact of the rib to surface 852B. During a shock incident, such as when the sensor is dropped prior to installation, the projection 219A located in aperture 856 allows the anchor plate 210 to move away from the seat belt.

Another feature that enhances the shock resistance of sensor 800 is the reverse stop 902 mounted to flange 203. When anchor plate 210 moves backwardly (towards strain gage 850), reverse stop 902 engages anchor plate arm 212 preventing further backwards movement of plate 210. This assists in keeping rib 906 away from substrate surface 852B. The reverse stop 902 prevents the anchor plate from moving backwards before it hits the strain gage. The reverse stop 902 prevents the backward load from reaching the sensor 850 and protects against shock damage.

The use of projection 219 allows the reverse stop 902 to contact arm 212 before rib 906 hits strain gage 850 therefore preventing damage during the shock incident. In this manner the strain gage 850 is isolated from the rib 906.

In a high load situation, the force applied to the seat belt overcomes the force of spring 218. Then, anchor plate 210 at rib 906 moves to rest against flange 203. Fastener 280 passes through holes 201, 217, 252 and is adjacent to flange 203. Additional force from the seat belt is then transferred to fastener 280 which is attached directly or indirectly to a vehicle mounting point such as the seat or floor. Thus, the additional or overload force is transferred from the seat belt to the vehicle. In this way, no further tension is applied to the strain gage 850 and it is thus protected from excessive forces by the limit structure 802A. When no seat belt tension is applied to anchor plate 210, the spring is compressed to 35 pounds. When rib 906 engages flange 203, the spring is compressed to 38 pounds. Any load beyond the 38 pounds is diverted through the flange 203 to bolt 280.

Figure 25:
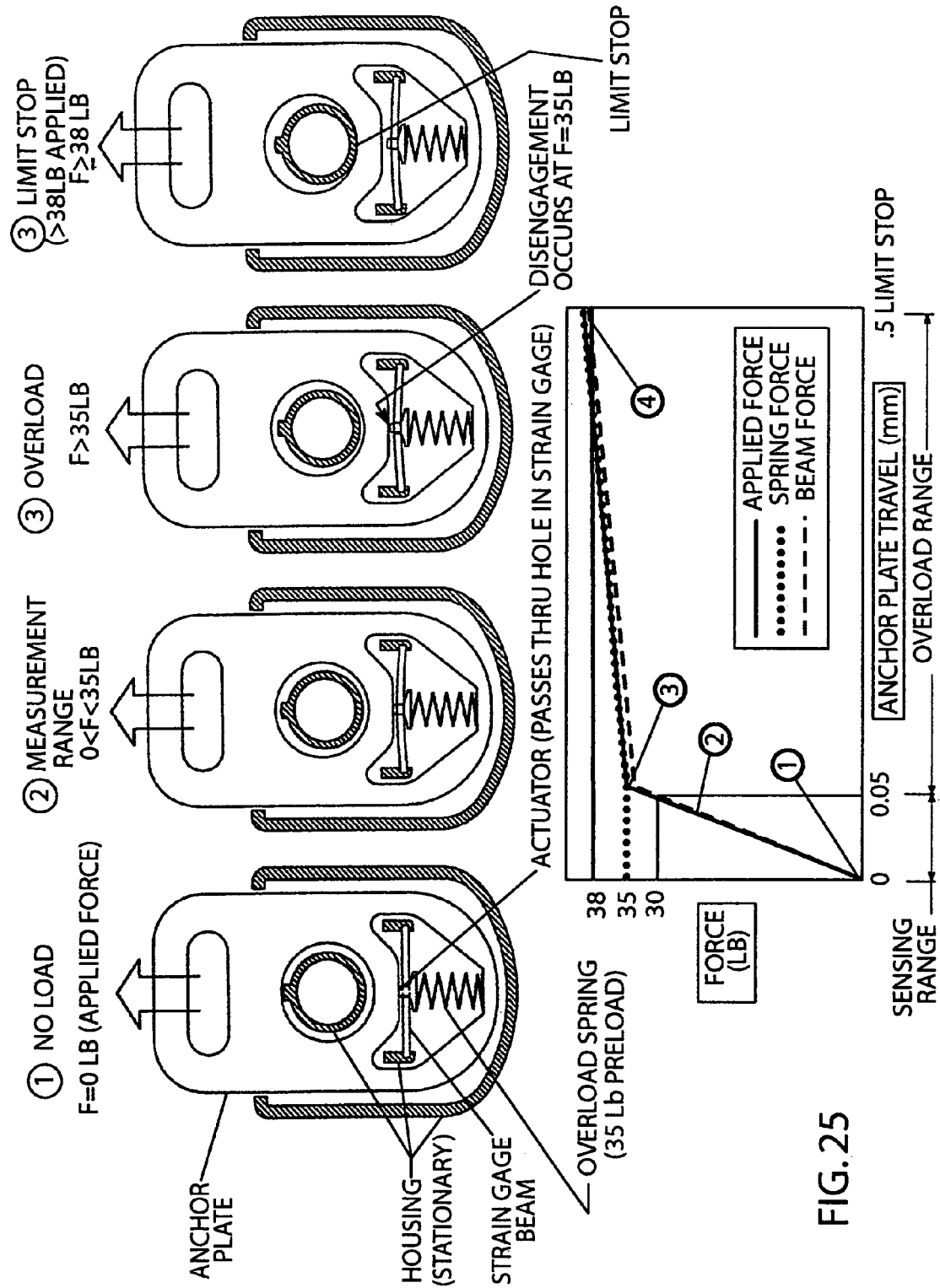
FIG. 25 is a graph of force versus deflection for the seat belt tension sensor of FIG. 17 and a series of diagrams showing how the sensor moves with applied tension.

A graph showing force versus travel for sensor 800 is provided in FIG. 25. FIG. 25 shows the force versus travel measured at three different locations:

1. The force applied to the sensor on anchor plate 210;
2. The compression spring force on spring 218;
3. The force on strain gage 850;

The applied force is shown increasing from 0 to 38 pounds. The applied force greater than 38 pounds is diverted through flange 203 to bolt 280. The force on spring 218 starts at the pre-compression value of 35 pounds and increases to a maximum of 38 pounds. The force on the strain gage 850 starts at 0 pounds and increases to a maximum of 38 pounds. There is no force applied to the strain gage when no tension is applied on the seat belt webbing.

Note that the graph varies linearly in a sensing range from 0 to 30 pounds. The sensing range increases up to the point of disengagement where projection 219A separates from contact with rib 906. The point of disengagement is about 35 pounds plus or minus a few pounds. Between 30 and 38 pounds of force the sensor is in the overload range. The curve flattens indicating an overload condition. The limit stop is the point at which the flange 203 contacts rib 906. Beyond the stop point all additional force is transferred to fastener 280.

Remarks about the Fourth Alternative Embodiment

The present seat belt tension sensor has several advantages. It provides for isolation from shock events and protects the strain sensitive resistors. The use of the actuator projection extending through the strain gage prevents the rib of the anchor plate from contacting the back side of the strain gage. This protects the strain gage from damage during a shock incident. The use of the posts and elastomeric washers prevents rattling of the sensor and allows for the sensor to be more quiet in a vehicle. The seat belt tension sensor allows accurate sensing of seat belt tension, while at the same time providing the structural strength needed for occupant restraint in a crash situation. The seat belt tension sensor further protects the strain gage from excessive loads that could damage the strain gage. The present invention allows an airbag controller to make better decisions as to when and how to deploy an airbag based upon more accurate seat occupant information.

While the invention has been taught with specific reference to these embodiments, someone skilled in the art will recognize that changes can be made in form and detail without departing from the spirit and the scope of the invention. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A seat belt tension sensor assembly comprising:
a housing defining a cavity;
at least one plate at least partially located in the housing, the plate defining a cutout and an aperture, the aperture being adapted to receive a fastener for securing the seat belt tension sensor assembly to a vehicle structure;
a sensor located in the housing within the space defined by the cutout in the plate, the sensor being adapted to generate an electrical signal that is indicative of seat belt tension in response to relative movement between the housing and the plate;
at least one spring located in the housing in the space defined by the cutout in the plate, the spring being seated between the sensor at one end and the plate at the other end; and
a wire harness in electrical communication with the sensor.

2. The seat belt tension sensor assembly according to claim 1 wherein the spring biases the sensor from the plate.

3. The seat belt tension sensor assembly according to claim 1 further comprising a cover for the housing.

4. The seat belt tension sensor assembly according to claim 1 wherein relative movement between the housing and the plate is limited.

5. The seat belt tension sensor assembly according to claim 4 wherein the plate is adapted to abut against a flange located in the housing for limiting the relative movement between the housing and the plate.

6. The seat belt tension sensor assembly according to claim 1 wherein the sensor further comprises at least one strain sensitive resistor.

7. The seat belt tension sensor assembly according to claim 1 wherein the sensor further comprises a substrate, at least one strain sensitive resistor being mounted on the substrate.

8. The seat belt tension sensor assembly according to claim 7 wherein the strain sensitive resistor is electrically connected to the wire harness.

9. A seat belt tension sensor assembly comprising:
a plate adapted to be secured to a vehicle and defining at least one cutout;
a housing, at least a portion of the plate being contained within the housing;
a sensor located in and coupled to the housing, the sensor being further located in the cutout and adapted to generate an electrical signal indicative of seat belt tension in response to relative movement between the housing and the plate;
at least one spring located in the housing, the spring being coupled between the sensor at one end and the plate at the other end; and
the plate being adapted to limit force applied to the sensor.

10. The seat belt tension sensor assembly according to claim 9 further comprising a cover for the housing.

11. The seat belt tension sensor assembly according to claim 9 wherein relative movement between the housing and the plate is limited.

12. The seat belt tension sensor assembly according to claim 9 wherein the sensor further comprises at least one strain sensitive resistor.

13. The seat belt tension sensor assembly according to claim 9 wherein the sensor further comprises a substrate, at least one strain sensitive resistor being mounted on the substrate.

* * * * *